US012683727B2

(12) United States Patent
Wei et al.

(10) Patent No.: US 12,683,727 B2
(45) Date of Patent: Jul. 14, 2026

(54) FLEXIBLE RESOURCE ALLOCATION FOR NARROWBAND AND WIDEBAND COEXISTENCE

(71) Applicant: QUALCOMM Incorporated, San Diego, CA (US)

(72) Inventors: Chao Wei, Beijing (CN); Le Liu, San Jose, CA (US); Alberto Rico Alvarino, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/586,710

(22) Filed: Feb. 26, 2024

(65) Prior Publication Data

US 2024/0195546 A1     Jun. 13, 2024

Related U.S. Application Data

(62) Division of application No. 17/256,878, filed as application No. PCT/CN2019/093029 on Jun. 26, 2019, now Pat. No. 11,973,702.

(51) Int. Cl.
H04W 4/00        (2018.01)
H04L 1/1607      (2023.01)
(Continued)

(52) U.S. Cl.
CPC .......... H04L 5/0012 (2013.01); H04L 1/1614 (2013.01); H04W 4/70 (2018.02);
(Continued)

(58) Field of Classification Search
None
See application file for complete search history.

(56) References Cited

U.S. PATENT DOCUMENTS

2009/0067377 A1    3/2009  Talukdar et al.
2014/0105151 A1    4/2014  Hong
(Continued)

FOREIGN PATENT DOCUMENTS

CN          103249049 A    8/2013
CN          106470393 A    3/2017
(Continued)

OTHER PUBLICATIONS

International Preliminary Report on Patentability—PCT/CN2018/ 093834 The International Bureau of WIPO—Geneva, Switzerland, Jan. 7, 2021.
(Continued)

*Primary Examiner* — Abdelillah Elmejjarmi
(74) *Attorney, Agent, or Firm* — Holland & Hart LLP

(57)                ABSTRACT

A user equipment (UE) (e.g., an enhanced machine type communication (EMTC) UE) may identify several narrowbands associated with eMTC protocol based on a system bandwidth of a New Radio (NR) carrier. A base station may transmit an indication of a set of valid narrowbands for eMTC (e.g., based on coexistence considerations between eMTC and NR) to the UE. The base station may further transmit a frequency hopping pattern to the UE (e.g., associated with narrowbands within the set of valid narrowbands), and transmit one or more downlink transmissions according to the frequency hopping pattern. Additionally or alternatively, a base station may identify a subcarrier offset and/or resource block offset between resources (e.g., a resource grid) used for eMTC protocol and resources used for NR. The base station may transmit a frequency alignment parameter to the UE, and the UE may align narrowbands for eMTC accordingly.

20 Claims, 26 Drawing Sheets

(51) Int. Cl.

| | |
|---|---|
| *H04L 5/00* | (2006.01) |
| *H04W 4/70* | (2018.01) |
| *H04W 4/80* | (2018.01) |
| *H04W 68/00* | (2009.01) |
| *H04W 72/0453* | (2023.01) |
| *H04W 72/23* | (2023.01) |

(52) U.S. Cl.

CPC ........... *H04W 4/80* (2018.02); *H04W 68/005* (2013.01); *H04W 72/0453* (2013.01); *H04W 72/23* (2023.01)

(56) References Cited

U.S. PATENT DOCUMENTS

| | | | |
|---|---|---|---|
| 2016/0249327 | A1 | 8/2016 | Chen et al. |
| 2016/0249358 | A1 | 8/2016 | Li et al. |
| 2016/0338062 | A1 | 11/2016 | Rico Alvarino et al. |
| 2017/0070994 | A1 | 3/2017 | Rico Alvarino et al. |
| 2017/0111894 | A1 | 4/2017 | Chen et al. |
| 2017/0126274 | A1 | 5/2017 | Kang et al. |
| 2017/0318410 | A1 | 11/2017 | Oh |
| 2017/0367074 | A1 | 12/2017 | Zhang et al. |
| 2018/0248668 | A1 | 8/2018 | Hwang et al. |
| 2019/0182899 | A1* | 6/2019 | Ye ........................... H04W 4/80 |
| 2019/0327718 | A1 | 10/2019 | Fang et al. |
| 2019/0357239 | A1 | 11/2019 | Moon et al. |
| 2021/0281371 | A1 | 9/2021 | Wei et al. |
| 2021/0385852 | A1 | 12/2021 | Papasakellariou et al. |
| 2024/0373410 | A1* | 11/2024 | Wong ................ H04W 72/0453 |

FOREIGN PATENT DOCUMENTS

| | | |
|---|---|---|
| CN | 106559860 A | 4/2017 |
| KR | 102413069 B1 | 6/2022 |

| | | | |
|---|---|---|---|
| WO | WO2016138244 | | 9/2016 |
| WO | WO2016186713 | | 11/2016 |
| WO | WO2017030345 | A1 | 2/2017 |
| WO | WO2017039843 | | 3/2017 |
| WO | WO2017043876 | A1 | 3/2017 |
| WO | WO2017076599 | A1 | 5/2017 |
| WO | WO2017134626 | A1 | 8/2017 |
| WO | WO2017200708 | | 11/2017 |
| WO | 2018031927 | A1 | 2/2018 |
| WO | 2018087734 | A1 | 5/2018 |

OTHER PUBLICATIONS

International Preliminary Report on Patentability—PCT/CN2019/093029 The International Bureau of WIPO—Geneva, Switzerland, Jan. 7, 2021.

International Search Report and Written Opinion—PCT/CN2018/093834—ISA/EPO—Feb. 27, 2019.

International Search Report and Written Opinion—PCT/CN2019/093029—ISA/EPO—Sep. 17, 2019.

LG Electronics: "PDSCH Related Issues for MTC", 3GPP TSG RAN WG1 Meeting #80bis, 3GPP Draft, R1-151489 Posch Related Issues for MTC, 3rd Generation Partnership Project (3GPP), Mobile Competence Centre, 650, Route Des Lucioles, F-06921 Sophia-Antipolis Cedex, France, vol. RAN WG1, No. Belgrade, Serbia, Apr. 20, 2015-Apr. 24, 2015, 4 Pages, Apr. 19, 2015 (Apr. 19, 2015), XP050934361, section 2.2.

Samsling: "Resource Allocation Aspects", 3GPP TSG RAN WG1 Meeting #88bis, R1-1705399, Apr. 7, 2017, 6 pages.

Supplementary European Search Report—EP19826021—Search Authority—The Hague—Jun. 7, 2022.

Supplementary Partial European Search Report—EP19826021—Search Authority—The Hague.

\* cited by examiner 1010           1015           1020

1005

1000

Identify a set of narrowbands associated with communication using a first protocol

1905

Receive an indication of a valid set of narrowbands

1910

Identify a frequency hopping pattern

1915

Receive the downlink transmission

1920

1900

Identify a set of narrowbands

2005

Receive an indication of a valid set of narrowbands

2010

Identify a frequency hopping pattern

2015

Receive an indication valid subframes

2020

Receive a downlink transmission

2025

2000

Identify a set of narrowbands associated with a first protocol

2105

Receive a frequency alignment parameter

2110

Align narrowbands

2115

Receive a downlink transmission

2120

2100

Identify a set of narrowbands 2305

Receive a first resource block shift 2310

Receive a second resource block shift 2315

Align the set of narrowbands 2325

Receive a downlink transmission 2330

2300

Identify a set of narrowbands

2405

Transmit an indication of a valid set of narrowbands

2410

Transmit a first frequency hopping pattern

2415

Transmit a first downlink transmission

2420

2400

Identify a set of narrowbands
2505

Transmit a frequency alignment parameter
2510

Transmit a downlink transmission
2515

2500

Identify a set of narrowbands ⟍ 2605

Identify a subcarrier offset between a RBG associated with the first protocol and a RBG associated with a second protocol ⟍ 2610

Transmit a frequency alignment parameter ⟍ 2615

Transmit a downlink transmission ⟍ 2620

2600

FLEXIBLE RESOURCE ALLOCATION FOR NARROWBAND AND WIDEBAND COEXISTENCE

CROSS REFERENCES

The present Application is a Divisional of U.S. patent application Ser. No. 17/256,878 by WEI et al., entitled "FLEXIBLE RESOURCE ALLOCATION FOR NARROWBAND AND WIDEBAND COEXISTENCE" filed Dec. 29, 2020, which is a 371 national phase filing of International Patent Application No. PCT/CN2019/093029 by WEI et. al., entitled "FLEXIBLE RESOURCE ALLOCATION FOR NARROWBAND AND WIDEBAND COEXISTENCE," filed Jun. 26, 2019; and claims priority to International Patent Application No. PCT/CN2018/093834 by WEI et. al., entitled "FLEXIBLE RESOURCE ALLOCATION FOR NARROWBAND AND WIDEBAND COEXISTENCE," filed Jun. 29, 2018, each of which is assigned to the assignee hereof and each of which is hereby incorporated by reference in its entirety.

BACKGROUND

The following relates generally to wireless communications, and more specifically to flexible resource allocation for narrowband (e.g., enhanced machine type communication (eMTC) protocol) and wideband (e.g., New Radio (NR) protocol) coexistence.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as NR systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some wireless communication systems may support narrowband communications that involve communications over a limited frequency bandwidth as compared to the frequency bandwidth used for other communications (e.g., such as LTE or NR communications). For example, eMTC may be limited to a narrowband within some system bandwidth (e.g., a system bandwidth of 10 MHz may be broken into 8 narrowbands, some of which may be utilized for eMTC). In some cases, the frequency of transmitted eMTC signals may be hopped between narrowbands. This frequency hopping may help achieve frequency diversity and may help avoid narrowband interference. As the number of narrowbands available to eMTC devices increase, more eMTC devices may be scheduled, increased gains may be realized due to frequency hopping, etc. However, resources within the system bandwidth (e.g., narrowbands) dedicated to eMTC may reduce the resources available to other protocols (e.g., LTE, NR, etc.).

SUMMARY

The described techniques relate to improved methods, systems, devices, and apparatuses that support flexible resource allocation for narrowband and wideband coexistence. Generally, the described techniques provide for frequency hopping schemes and narrowband/resource grid (e.g., frequency) alignment schemes for improved narrowband (e.g., enhanced machine type communication (eMTC) protocol) and wideband (e.g., New Radio (NR) protocol) coexistence.

A user equipment (UE) (e.g., a machine type communication (MTC) UE) may identify several narrowbands associated with communication using a first protocol (e.g., associated with eMTC protocol) based on a system bandwidth of a carrier. A base station may identify a set of valid narrowbands (e.g., a set of the several narrowbands corresponding to the system bandwidth that are valid for eMTC), and may transmit an indication of the set of valid narrowbands to the UE. In some cases, the set of valid narrowbands may be indicated via a bitmap. For example, a bitmap may be signaled to indicate narrowbands or widebands (e.g., groups of narrowbands) within the system bandwidth that are valid for eMTC. The base station may further transmit a frequency hopping pattern to the UE (e.g., a pattern of frequency transitioning or frequency hopping amongst narrowbands within the set of valid narrowbands), and transmit one or more downlink transmissions (e.g., MTC physical downlink control channel (MPDCCH), physical downlink shared channel (PDSCH), etc.) according to the frequency hopping pattern. In some cases, the base station may further indicate a set of subframes that are valid for communication of the first protocol, in conjunction with the valid set of narrowbands. The UE may receive the indication of the valid set of narrowbands (e.g., and in some cases the valid set of subframes for each of the plurality of narrowbands), as well as the frequency hopping pattern. The UE may perform frequency hopping, across the set of valid narrowbands, to receive time domain repetitions of a downlink transmission according to the frequency hopping pattern.

Additionally or alternatively, a base station may identify an offset between resources (e.g., a resource grid) used for communication using a first protocol (e.g., eMTC protocol) and resources used for communication using a second protocol (e.g., NR protocol). For example, a base station may identify a subcarrier offset between a resource block grid associated with the first protocol and a resource block grid associated with a second protocol, a resource block (RB) offset between a start of a narrowband (e.g., associated with the first protocol) and a resource block group (RBG) (e.g., associated with the second protocol), or both. The base station may transmit a frequency alignment parameter (e.g., a resource grid alignment parameter) for communication using the first protocol (e.g., indicating a subcarrier offset, a RB offset, or both) to a UE (e.g., an MTC UE). The UE may receive the frequency alignment parameter, and may align narrowbands (e.g., narrowbands identified based on some system bandwidth a carrier, or some indicated set of valid narrowbands) according to the frequency alignment parameter. The UE may then receive downlink transmissions based on the aligned narrowbands (e.g., based on narrowbands or frequency resources having been aligned using the frequency alignment parameter).

A method of wireless communication at a UE is described. The method may include identifying, based on a system bandwidth of a carrier, a set of narrowbands associated with communication using a first protocol. The method may further include receiving an indication of a valid set of narrowbands (e.g., a valid set of the set of narrowbands identified based on the system bandwidth) for the communication using the first protocol, identifying a frequency hopping pattern for the communication using the first protocol, and receiving a downlink transmission based on frequency hopping for a plurality of time domain repetitions of the downlink transmission across the valid set of narrowbands according to the frequency hopping pattern.

An apparatus for wireless communication at a UE is described. The apparatus may include a processor, memory in electronic communication with the processor, and instructions stored in the memory. The instructions may be executable by the processor to cause the apparatus to identify, based on a system bandwidth of a carrier, a set of narrowbands associated with communication using a first protocol. The instructions may be executable by the processor to further cause the apparatus to receive an indication of a valid set of narrowbands for the communication using the first protocol, identify a frequency hopping pattern for the communication using the first protocol, and receive a downlink transmission based on frequency hopping for a plurality of time domain repetitions of the downlink transmission across the valid set of narrowbands according to the frequency hopping pattern.

Another apparatus for wireless communication at a UE is described. The apparatus may include means for identifying, based on a system bandwidth of a carrier, a set of narrowbands associated with communication using a first protocol. The apparatus may further include means for receiving an indication of a valid set of narrowbands for the communication using the first protocol, identifying a frequency hopping pattern for the communication using the first protocol, and receiving a downlink transmission based on frequency hopping for a plurality of time domain repetitions of the downlink transmission across the valid set of narrowbands according to the frequency hopping pattern.

A non-transitory computer-readable medium storing code for wireless communication at a UE is described. The code may include instructions executable by a processor to identify, based on a system bandwidth of a carrier, a set of narrowbands associated with communication using a first protocol. The instructions may be further executable by a processor to receive an indication of a valid set of narrowbands for the communication using the first protocol, identify a frequency hopping pattern for the communication using the first protocol, and receive a downlink transmission based on frequency hopping for a plurality of time domain repetitions of the downlink transmission across the valid set of narrowbands according to the frequency hopping pattern.

In some examples of the method, apparatuses, and non-transitory computer-readable medium described herein, receiving the downlink transmission may include operations, features, means, or instructions for performing frequency hopping for a set of time domain repetitions of the downlink transmission across the valid set of narrowbands that may be valid for the communication using the first protocol according to the frequency hopping pattern, where the downlink transmission may be received based on the frequency hopping.

In some examples of the method, apparatuses, and non-transitory computer-readable medium described herein, receiving the downlink transmission may include operations, features, means, or instructions for receiving a control message for paging via a MPDCCH mapped to the valid set of narrowbands that may be valid for the communication using the first protocol according to the frequency hopping and receiving, based on the control message, a paging message via a PDSCH mapped to the valid set of narrowbands according to the frequency hopping.

In some examples of the method, apparatuses, and non-transitory computer-readable medium described herein, receiving the indication of the valid set of narrowbands that may be valid for the communication using the first protocol further may include operations, features, means, or instructions for receiving a bitmap including one or more values indicating whether each narrowband of the set of narrowbands may be within the valid set of narrowbands that may be valid for the communication the first protocol.

In some examples of the method, apparatuses, and non-transitory computer-readable medium described herein, the bitmap includes values for each of the set of narrowbands of the carrier. In some examples of the method, apparatuses, and non-transitory computer-readable medium described herein, the bitmap includes values for one or more widebands of the carrier, where each wideband consists of a number of continuous narrowbands.

Some examples of the method, apparatuses, and non-transitory computer-readable medium described herein may further include operations, features, means, or instructions for receiving an indication of one or more subframes that are valid for a narrowband associated with the first protocol and receiving the downlink transmission based on the indication. Some examples of the method, apparatuses, and non-transitory computer-readable medium described herein may further include operations, features, means, or instructions for receiving an indication of a second valid set of narrowbands that may be valid for the communication using the first protocol and transmitting an uplink transmission based on the second valid set of narrowbands.

In some examples of the method, apparatuses, and non-transitory computer-readable medium described herein, the carrier may be associated with a second protocol and the valid set of narrowbands that may be valid for the communication using the first protocol may be based on the carrier being associated with the second protocol. In some examples of the method, apparatuses, and non-transitory computer-readable medium described herein, the first protocol includes an eMTC protocol and the second protocol includes a NR protocol.

A method of wireless communication at a UE is described. The method may include identifying, based on a system bandwidth of a carrier, a set of narrowbands associated with a first protocol. The method may further include receiving a frequency alignment parameter for communication using the first protocol, aligning the plurality of narrowbands based at least in part on the system bandwidth and the frequency alignment parameter, and receiving a downlink transmission based on the aligned set of narrowbands.

An apparatus for wireless communication at a UE is described. The apparatus may include a processor, memory in electronic communication with the processor, and instructions stored in the memory. The instructions may be executable by the processor to cause the apparatus to identify, based on a system bandwidth of a carrier, a set of narrowbands associated with a first protocol, receive a frequency alignment parameter for communication using the first protocol, aligning the plurality of narrowbands based at least in part on the system bandwidth and the frequency alignment parameter, and receive a downlink transmission based on the aligned set of narrowbands.

Another apparatus for wireless communication at a UE is described. The apparatus may include means for identifying, based on a system bandwidth of a carrier, a set of narrowbands associated with a first protocol, receiving a frequency alignment parameter for communication using the first protocol, aligning the plurality of narrowbands based at least in part on the system bandwidth and the frequency alignment parameter, and receiving a downlink transmission based on the aligned set of narrowbands.

A non-transitory computer-readable medium storing code for wireless communication at a UE is described. The code may include instructions executable by a processor to identify, based on a system bandwidth of a carrier, a set of narrowbands associated with a first protocol, receive a frequency alignment parameter for communication using the first protocol, aligning the plurality of narrowbands based at least in part on the system bandwidth and the frequency alignment parameter, and receive a downlink transmission based on the aligned set of narrowbands.

In some examples of the method, apparatuses, and non-transitory computer-readable medium described herein, receiving the frequency alignment parameter may include operations, features, means, or instructions for receiving a first subcarrier offset for a first set of narrowbands and receiving a second subcarrier offset for a second set of narrowbands, where the first set of narrowbands may be associated with subcarriers having lower frequencies than a center subcarrier of the system bandwidth and the second set of narrowbands may be associated with subcarriers having higher frequencies than the center subcarrier.

In some examples of the method, apparatuses, and non-transitory computer-readable medium described herein, receiving the frequency alignment parameter may include operations, features, means, or instructions for receiving a first resource block shift for aligning a start of a narrowband of the set of narrowbands with a RBG associated with a second protocol and receiving a second resource block shift for aligning an end of the narrowband with the RBG associated with the second protocol.

Some examples of the method, apparatuses, and non-transitory computer-readable medium described herein may further include operations, features, means, or instructions for receiving a DCI state indication, where the DCI state indication indicates a resource allocation based on the first resource block shift or the second resource block shift. Some examples of the method, apparatuses, and non-transitory computer-readable medium described herein may further include operations, features, means, or instructions for receiving a one bit shift indicator associated with one or more narrowbands of the plurality of narrowbands, where the one bit shift indicator indicates either the first resource block shift or the second resource block shift. In some examples of the method, apparatuses, and non-transitory computer-readable medium described herein, the first protocol includes an eMTC protocol and the second protocol includes a NR protocol, and where the frequency alignment parameter may be based on the RBG being associated with the second protocol.

A method of wireless communication at a base station is described. The method may include identifying, based on a system bandwidth of a carrier, a set of narrowbands associated with a first protocol. The method may further include transmitting, to a first UE, an indication of a valid set of narrowbands for the communication using the first protocol, transmitting, to the first UE, a first frequency hopping pattern for the communication using the first protocol, and transmitting, to the first UE, a first downlink transmission based on the valid set of narrowbands and the first frequency hopping pattern.

An apparatus for wireless communication at a base station is described. The apparatus may include a processor, memory in electronic communication with the processor, and instructions stored in the memory. The instructions may be executable by the processor to cause the apparatus to identify, based on a system bandwidth of a carrier, a set of narrowbands associated with a first protocol, transmit, to a first UE, an indication of a valid set of narrowbands for the communication using the first protocol, transmit, to the first UE, a first frequency hopping pattern for the communication using the first protocol, and transmit, to the first UE, a first downlink transmission based on the valid set of narrowbands and the first frequency hopping pattern.

Another apparatus for wireless communication at a base station is described. The apparatus may include means for identifying, based on a system bandwidth of a carrier, a set of narrowbands associated with a first protocol, transmitting, to a first UE, an indication of a valid set of narrowbands for the communication using the first protocol, transmitting, to the first UE, a first frequency hopping pattern for the communication using the first protocol, and transmitting, to the first UE, a first downlink transmission based on the valid set of narrowbands and the first frequency hopping pattern.

A non-transitory computer-readable medium storing code for wireless communication at a base station is described. The code may include instructions executable by a processor to identify, based on a system bandwidth of a carrier, a set of narrowbands associated with a first protocol, transmit, to a first UE, an indication of a valid set of narrowbands for the communication using the first protocol, transmit, to the first UE, a first frequency hopping pattern for the communication using the first protocol, and transmit, to the first UE, a first downlink transmission based on the valid set of narrowbands and the first frequency hopping pattern.

Some examples of the method, apparatuses, and non-transitory computer-readable medium described herein may further include operations, features, means, or instructions for transmitting, to the first UE, a set of repetitions of a control message for paging via a MPDCCH mapped to the valid set of narrowbands that may be valid for the communication using the first protocol according to the first frequency hopping pattern and transmitting, to the first UE, a set of repetitions of a paging message via PDSCH mapped to the valid set of narrowbands according to the first frequency hopping pattern and the control message for paging.

Some examples of the method, apparatuses, and non-transitory computer-readable medium described herein may further include operations, features, means, or instructions for transmitting, to a second UE, a second frequency hopping pattern for the communication using the first protocol and transmitting, to the second UE, a second downlink transmission based on the set of narrowbands associated with the first protocol and the second frequency hopping pattern.

In some examples of the method, apparatuses, and non-transitory computer-readable medium described herein, transmitting the indication of the valid set of narrowbands that may be valid for the communication using the first protocol further may include operations, features, means, or instructions for transmitting a bitmap including one or more values indicating whether each narrowband of the set of narrowbands may be within the valid set of narrowbands that may be valid for the communication using the first protocol.

In some examples of the method, apparatuses, and non-transitory computer-readable medium described herein, the bitmap includes values for each of the set of narrowbands of the carrier. In some examples of the method, apparatuses, and non-transitory computer-readable medium described herein, the bitmap includes values for one or more widebands of the carrier, where each wideband consists of a number of continuous narrowbands.

Some examples of the method, apparatuses, and non-transitory computer-readable medium described herein may further include operations, features, means, or instructions for transmitting an indication of one or more subframes that may be valid for a narrowband associated with the first protocol and transmitting the first downlink transmission based on the indication. Some examples of the method, apparatuses, and non-transitory computer-readable medium described herein may further include operations, features, means, or instructions for transmitting an indication of a second valid set of narrowbands that may be valid for the communication using the first protocol and receiving an uplink transmission based on the second set of the plurality of narrowbands.

In some examples of the method, apparatuses, and non-transitory computer-readable medium described herein, the carrier may be associated with a second protocol and the valid set of narrowbands that may be valid for the communication using the first protocol may be based on the carrier being associated with the second protocol. In some examples of the method, apparatuses, and non-transitory computer-readable medium described herein, the first protocol includes an eMTC protocol and the second protocol includes a NR protocol.

A method of wireless communication at a base station is described. The method may include identifying, based on a system bandwidth of a carrier, a set of narrowbands associated with communication using a first protocol. The method may further include transmitting a frequency alignment parameter for the communication using the first protocol, and transmitting a downlink transmission based on the identified set of narrowbands and the frequency alignment parameter.

An apparatus for wireless communication at a base station is described. The apparatus may include a processor, memory in electronic communication with the processor, and instructions stored in the memory. The instructions may be executable by the processor to cause the apparatus to identify, based on a system bandwidth of a carrier, a set of narrowbands associated with communication using a first protocol, transmit a frequency alignment parameter for the communication using the first protocol, and transmit a downlink transmission based on the identified set of narrowbands and the frequency alignment parameter.

Another apparatus for wireless communication at a base station is described. The apparatus may include means for identifying, based on a system bandwidth of a carrier, a set of narrowbands associated with communication using a first protocol, transmitting a frequency alignment parameter for the communication using the first protocol, and transmitting a downlink transmission based on the identified set of narrowbands and the frequency alignment parameter.

A non-transitory computer-readable medium storing code for wireless communication at a base station is described. The code may include instructions executable by a processor to identify, based on a system bandwidth of a carrier, a set of narrowbands associated with communication using a first protocol, transmit a frequency alignment parameter for the communication using the first protocol, and transmit a downlink transmission based on the identified set of narrowbands and the frequency alignment parameter. Some examples of the method, apparatuses, and non-transitory computer-readable medium described herein may further include operations, features, means, or instructions for identifying a subcarrier offset between a resource block grid associated with the first protocol and a resource block grid associated with a second protocol, where the frequency alignment parameter may be based on the identified subcarrier offset.

In some examples of the method, apparatuses, and non-transitory computer-readable medium described herein, transmitting the frequency alignment parameter may include operations, features, means, or instructions for transmitting a first subcarrier offset for a first set of narrowbands and transmitting a second subcarrier offset for a second set of narrowbands, where the first set of narrowbands may be associated with subcarriers having lower frequencies than a center subcarrier of the system bandwidth and the second set of narrowbands may be associated with subcarriers having higher frequencies than the center subcarrier.

In some examples of the method, apparatuses, and non-transitory computer-readable medium described herein, transmitting the frequency alignment parameter may include operations, features, means, or instructions for transmitting a first resource block shift for aligning a start of a narrowband of the set of narrowbands with a RBG associated with a second protocol and transmitting a second resource block shift for aligning an end of the narrowband with the RBG associated with the second protocol.

Some examples of the method, apparatuses, and non-transitory computer-readable medium described herein may further include operations, features, means, or instructions for transmitting a DCI state indication, where the DCI state indication indicates a resource allocation based on the first resource block shift or the second resource block shift. Some examples of the method, apparatuses, and non-transitory computer-readable medium described herein may further include operations, features, means, or instructions for transmitting a one bit shift indicator associated with one or more narrowbands of the plurality of narrowbands, where the one bit shift indicator indicates either the first resource block shift or the second resource block shift.

In some examples of the method, apparatuses, and non-transitory computer-readable medium described herein, the first protocol includes an eMTC protocol and the second protocol includes a NR protocol, and where the frequency alignment parameter may be based on the RBG being associated with the second protocol.

DETAILED DESCRIPTION

Figure 1:
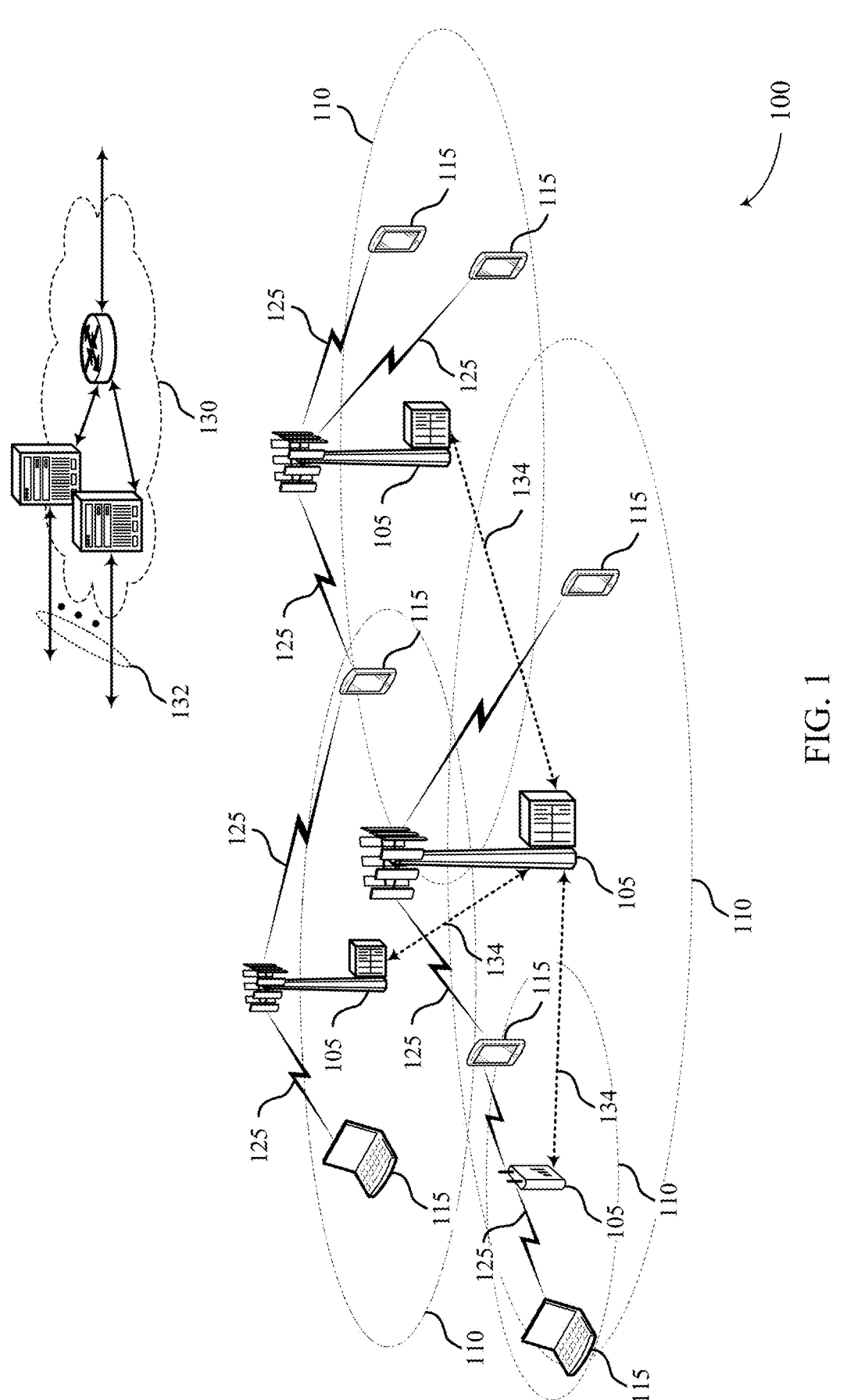
FIG. 1 illustrates an example of a system for wireless communications that supports flexible resource allocation for narrowband and wideband coexistence in accordance with aspects of the present disclosure.

Some wireless communications systems support data communication technologies that allow devices (e.g., user equipments (UEs)) to communicate with one another or a base station without human intervention. Such communication may be referred to as Machine Type Communication (MTC). In some cases, systems may support MTC by using techniques or features tailored for MTC devices. Techniques or features employed for the purpose of improving MTC may be referred to as enhanced MTC (eMTC). To support eMTC, systems may be configured to account for operating characteristics of MTC devices (e.g., MTC UEs), which may be different from operating characteristics of other UEs. This may include broadcasting certain MTC-specific system information using various repetition levels, transport block sizes, and the like. An MTC device or MTC UE may be a low complexity, low cost device—relative to other UEs—and may be characterized by features such as low power operation, limited duplexing capability, and operation in environments with poor radio link conditions. Additionally, some MTC UEs may be configured to operate using a narrow bandwidth, as compared with bandwidth used by other UEs or as compared with a total available system bandwidth. Systems supporting eMTC may be configured with these MTC UE characteristics in mind. In particular, in some examples and as described below, systems may support eMTC by supporting narrowband operation within a larger system bandwidth.

In some cases, the frequency of transmitted signals (e.g., the frequency resources utilized for transmitted signals) may be changed periodically. This frequency hopping may help achieve frequency diversity and may help avoid or reduce narrowband interference. UEs may receive the signal as the frequency is changed according to some frequency hopping pattern configured by the base station. Frequency hopping techniques may be used in connection with eMTC. For example, an MTC UE may perform frequency hopping between narrowbands for downlink (DL) and uplink (UL) communications. As the number of narrowbands available to MTC devices increase, more MTC devices may be scheduled, increased gains may be realized due to frequency hopping over a broader set of narrowband frequencies, etc. However, resources within the system bandwidth (e.g., narrowbands) dedicated to eMTC may reduce the resources available to other protocols (e.g., Long Term Evolution (LTE), New Radio (NR), etc.).

For example, to support eMTC, systems may be configured to account for operating characteristics of MTC devices. In some cases, MTC UEs may use narrowband operation within a wider system bandwidth that may be associated with another protocol (e.g., LTE or NR). For example, for eMTC in-band operation in an NR carrier, a system bandwidth associated with NR protocol may be divided into several narrowbands for eMTC. The resources (e.g., narrowbands) used by eMTC may be configured as reserved resources for NR rate matching. That is, resources for eMTC messages (e.g., sent via a MTC physical downlink control channel (MPDCCH)) and other downlink transmissions (e.g., sent via a physical downlink shared channel (PDSCH)) may be configured as dynamic rate matching resources using layer 1 (L1) indications in downlink control information (DCI). Therefore, as more narrowbands are allocated for eMTC, less resources may be available for NR and more signaling overhead (e.g., more bits in DCI) may be used for indication of NR rate matching resource sets corresponding to the narrowbands allocated for eMTC. Additionally, in some cases where MTC UEs use narrowband operation within a wider system bandwidth associated with another protocol, a resource block (RB) grid associated with eMTC may not be aligned with a RB grid associated with the protocol associated with the system bandwidth (e.g., due to a modulated direct current (DC) subcarrier in NR, a floating sync block in NR, etc.).

The techniques described herein provide for a reduced narrowband set for eMTC, within a system bandwidth of a carrier associated with another protocol. For example, the network (e.g., a base station) may identify a set of narrowbands (e.g., a valid set of narrowbands) within a carrier associated with another protocol (e.g., within an NR carrier), and may configure eMTC device frequency hopping within the set to effectively reduce narrowbands used by eMTC when coexisting with NR on the same band. eMTC devices capable of receiving and employing valid sets of narrowbands within a larger system bandwidth may receive an indication of such a valid set, as well as a first frequency hopping pattern to be implemented for reception of MPDCCH and PDSCH within (e.g., across) the valid set of narrowbands. MTC devices that are not capable of receiving and employing valid sets of narrowbands (e.g., legacy MTC devices) may be configured with a second frequency hopping pattern to be implemented for reception of PDSCH across the valid set of narrowbands (e.g., the second frequency hopping pattern may be configured such that the legacy eMTC devices frequency hop to a narrowband within the valid set). That is, a legacy eMTC device not capable of employing valid sets of narrowbands (e.g., eMTC devices that determine narrowband numerology solely on carrier system bandwidth) may be configured with a frequency hopping pattern that ensures the legacy eMTC device skips non-valid narrowbands. Legacy eMTC devices may be configured to not employ frequency hopping for reception of MPDCCH.

Additionally or alternatively, the described techniques may further provide for alignment of the eMTC RB grid and the NR RB grid, alignment of eMTC narrowbands with NR resource block groups (RBGs), or both. For example, the network (e.g., a base station) may identify a subcarrier offset, a RB offset, or both, and may transmit a frequency alignment parameter to the eMTC device. The eMTC device may receive the frequency alignment parameter (e.g., a subcarrier offset, a RB offset, etc.) and may align one or more narrowbands accordingly. As such, the eMTC RB grid and NR RB grid may be aligned, which may allow for dynamic resource sharing between eMTC and NR based on the scheduling (e.g., instead of rate matching based on reserved resources. That is, NR RBGs overlapping with MPDCCH/PDSCH may not be allocated to NR UEs by the scheduler.

Aspects of the disclosure are initially described in the context of a wireless communications system. Example frequency hopping schemes, narrowband alignment schemes, and process flows implementing the discussed techniques are then described. Aspects of the disclosure are further illustrated by and described with reference to apparatus diagrams, system diagrams, and flowcharts that relate to flexible resource allocation for narrowband and wideband coexistence.

FIG. 1 illustrates an example of a wireless communications system 100 that supports flexible resource allocation for narrowband and wideband coexistence in accordance with aspects of the present disclosure. The wireless communications system 100 includes base stations 105, UEs 115, and a core network 130. In some examples, the wireless communications system 100 may be a LTE network, an LTE-Advanced (LTE-A) network, an LTE-A Pro network, or a NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocols (e.g., MTC, narrowband Internet-of-Things (NB-IOT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IOT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Additional MTC enhancements (e.g., which may be referred to as eMTC) may be supported as well. For example, to support eMTC, wireless communications system 100 may be configured to account for operating characteristics of MTC devices (e.g., MTC UEs). Narrowband operation may be supported, such that MTC UEs 115 may be able to operate in a wider system bandwidth (e.g., an MTC UE 115 may operate in narrowband regions of a larger system bandwidth). In some examples, eMTC may reduce device complexity, enable multi-year battery life, and provide deeper coverage to reach challenging locations such as deep inside buildings. In some cases, MTC devices, or MTC UEs 115, and eMTC device, or eMTC UEs 115, may be used interchangeably.

In some cases, wireless communications system 100 may utilize Coverage Enhancement (CE) techniques to improve the quality of a communication link 125 for UEs 115, including MTC UEs 115, located at a cell edge, operating with low power transceivers, or experiencing high interference or path loss. CE techniques may include repeated transmissions, TTI bundling, HARQ retransmission, PUSCH hopping, beamforming, power boosting, or other techniques. The CE techniques used may depend on the specific needs of UEs 115 in different circumstances. For example, TTI bundling may involve sending multiple copies of the same information in a group of consecutive TTIs rather than waiting for a negative acknowledgement (NACK) before retransmitting redundancy versions. This may be effective for users engaging in voice over Long Term evolution (VOLTE) or VOIP communications, as well as for MTC UEs 115 operating with coverage limitations. In other cases, the number of HARQ retransmissions may also be increased. Uplink data transmissions may be transmitted using frequency hopping to achieve frequency diversity. Beamforming may be used to increase the strength of a signal in a particular direction, or the transmission power may simply be increased. In some cases, one or more CE options may be combined, and CE levels may be defined based on a number of decibels the techniques are expected to improve a signal (e.g., no CE, 5 dB CE, 10 dB CE, 15 dB CE, etc.). In some cases, the scheduling parameters for SIB1 may depend on the frequency hopping configuration. This configuration may be explicitly signaled in the bitfield contained within the MIB, for example.

For example, some systems may employ CE modes (e.g., CE Mode A & CE Mode B) to support eMTC devices, Internet of Things (IOT) devices, etc. (e.g., Cat M1, M2 UEs). Supporting CE Mode operation may involve the network broadcasting, and devices that support CE Mode operation being able to process, new types of bandwidth reduced (BR) system information blocks (BR-SIBs) (e.g. such as SIB1-BR) that differ from legacy SIBs. In some cases, CE Mode devices may be capable of supporting both legacy SIBs and the new SIBs (e.g., BR versions). CE techniques may increase system robustness. There may be different levels of CE such that higher level CE may provide more reliable communications, particularly for devices that are located relatively far away from a base station or in locations where wireless transmissions are relatively highly attenuated (e.g., in a basement location), relative to lower level CEs. In some cases, CE may rely on repetition of transmissions.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol that is associated with a predefined portion or range (e.g., set of subcarriers or RBs) within a carrier (e.g., "in-band" deployment of a narrowband protocol).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems, such as an NR system, may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications system 100 may support frequency hopping schemes and frequency alignment schemes for improved narrowband (e.g., eMTC protocol) and wideband (e.g., NR protocol) coexistence. For example, MTC UEs 115 may identify several narrowbands associated with eMTC protocol based on a system bandwidth of a carrier associated with the NR protocol. In some cases, the MTC UE may not be aware that the carrier is associated with the NR protocol, and the MTC UE may identify the several narrowbands based solely on the system bandwidth (e.g., identify narrowbands based on the size or frequency range of the system bandwidth, based on how many narrowbands fit within the system bandwidth, etc.). A base station 105 may identify a set of valid narrowbands for eMTC (e.g., based on coexistence considerations between eMTC and NR). For example, the base station 105 may identify eMTC operation in-band with an NR carrier, and may decide to reduce the number of narrowbands available for eMTC within the carrier (e.g., the base station 105 may indicate a set of narrowbands valid for eMTC, to the eMTC UE and for use by the eMTC UE, to preserve frequency regions within the carrier for NR communications). The base station 105 may transmit an indication of the set of valid narrowbands (e.g., via a valid narrowband bitmap or a valid wideband bitmap) to the MTC UEs 115. The base station 105 may further transmit a frequency hopping pattern to an MTC UE 115 (e.g., a pattern of frequency transitioning or frequency hopping amongst narrowbands within the set of valid narrowbands), and may transmit one or more downlink transmissions according to the frequency hopping pattern.

Additionally or alternatively, a base station 105 may identify a subcarrier offset and/or a resource block offset between resources (e.g., a resource grid) used for eMTC protocol and resources (e.g., a resource grid) used for NR. The base station 105 may transmit a frequency alignment parameter to an MTC UE 115. The MTC UE 115 may align narrowbands for eMTC with the NR resource grid (e.g., with the NR subcarriers, with the NR RBG, or both). The base station 105 and the MTC UE 115 may then communicate according to MTC UE identified narrowbands, or base station indicated valid narrowbands, based on the alignment.

Figure 2:
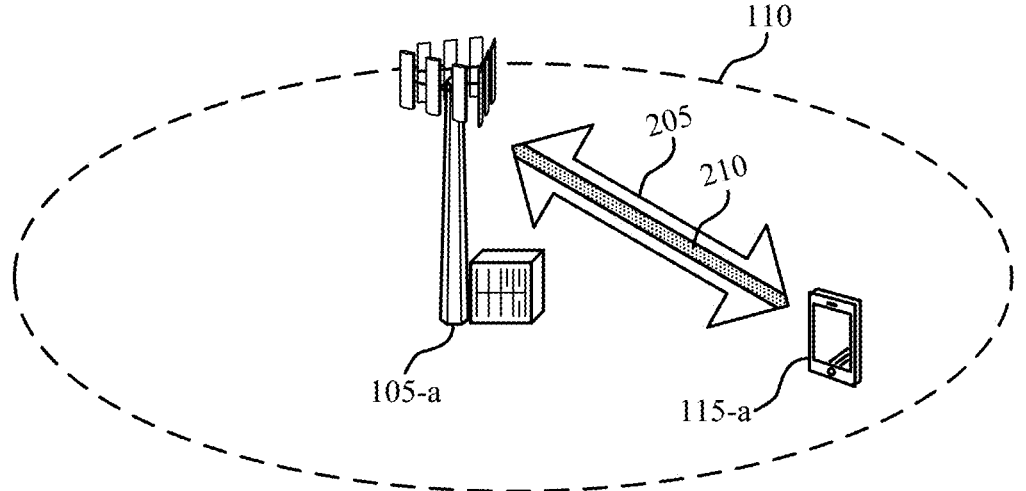
FIG. 2 illustrates an example of a wireless communications system that supports flexible resource allocation for narrowband and wideband coexistence in accordance with aspects of the present disclosure.

FIG. 2 illustrates an example of a wireless communications system 200 that supports flexible resource allocation for narrowband and wideband coexistence in accordance with aspects of the present disclosure. In some examples, wireless communications system 200 may implement aspects of wireless communications system 100. Wireless communications system 200 may include a UE 115-a and base station 105-a, which may be examples of a UE 115 and base station 105 described with reference to FIG. 1. Carrier 205 may be divided into multiple narrowband regions serving different devices, and UE 115-a may operate in a narrowband region 210 within the frequency range or system bandwidth of carrier 205. In some cases, UE 115-a may be an MTC device, and base station 105-a may dynamically allocate a valid set of narrowband resources (e.g., base station 105-a may dynamically allocate a valid set of narrowband regions 210 for eMTC) for coexistence with wideband communication (e.g., for coexistence with other in-band resources allocated for NR). The valid set of narrowband resources may be, for example, a subset of a total number of narrowband regions within the system bandwidth of the carrier 205. Base station 105-a may indicate the valid set of narrowband resources to UE 115-a (e.g., in system information, via RRC signaling). Additionally, base station 105-a may transmit a frequency alignment parameter (e.g., a frequency resource grid alignment parameter) to UE 115-a to align one or more narrowbands used by UE 115-a (e.g., for eMTC) with a resource grid associated with a communication protocol associated with the system bandwidth (e.g., to align narrowbands used for eMTC with the NR resource grid).

Wireless communications system 200 may support MTC operations to enable operation of low cost and low complexity devices. For example, in the context of LTE systems, such low cost UEs or MTC UEs (e.g., including UE 115-a) may be referred to as category 0 UEs, which may be characterized by reduced peak data rates (e.g., a possible maximum of 1000 bits for a transport block size), rank one transmission, one receive antenna, and, if half-duplex, relaxed switching timing (from transmission to reception or vice versa) from, for example, 20 us for regular UEs to 1 ms for MTC UEs. These MTC UEs may monitor downlink channels in manner similar to other UEs 115, including monitoring of MPDCCH, enhanced PDCCH (ePDCCH), PDSCH, etc. Additional MTC enhancements (referred to as eMTC) may be supported as well. For example, to support eMTC, wireless communications system 200 may be configured to account for operating characteristics of MTC devices (e.g., such as UE 115-a). Narrowband operation may be supported, such that MTC UE 115-a may be able to operate in a wider system bandwidth. In some cases, wireless communications system 200 may support operation in multiple system bandwidth ranges (e.g., 1.4/3/5/10/15/20 MHz). For example, a 10 MHz system bandwidth (e.g., a carrier 205 associated with a 10 MHz frequency range) associated with NR protocol may include 50 physical resource blocks (PRBs), and narrowband regions 210 (e.g., for eMTC) may be divided into 1.4 MHz or 6 PRBs.

That is, an MTC device (e.g., such as UE 115-a) may transmit or receive over a narrowband bandwidth (e.g., a narrowband region 210 of 6 consecutive RBs). As such, carrier 205 may be split into a number of non-overlapping narrowband regions 210. The total number of narrowband regions 210 in the system bandwidth associated with the carrier 205 may be fixed as $N_{NB}=N_{RB}/6$. That is, the number of narrowband regions 210 ($N_{NB}$) may be determined as the number of RBs ($N_{RB}$) within the system bandwidth of carrier 205 divided by 6 (e.g., $N_{RB}$ divided by 6 RBs, corresponding to the size of each narrowband region 210). In some cases, there may be one or more RBs within the system bandwidth of carrier 205 that are not a part of, or included in, any narrowband region 210 (e.g., one or more RBs at each edge of carrier 205 may not be a part of, or included in, any narrowband region 210). Further, the center RB of the carrier 205 may not be a part of, or included in, any narrowband region 210 (e.g., in cases where carrier 205 includes an odd number of RBs within the overall system bandwidth).

In some cases, UE 115-a (e.g., an eMTC device) may switch narrowbands between subframes (e.g., using inter-subframe frequency hopping to achieve frequency diversity gain). Such frequency hopping may be carried out in blocks of $N_{hop}$ subframes, which may be cell specific and configured commonly for all the frequency hopping devices within the cell. That is, within a cell, frequency hopping devices may all be configured to frequency hop every $N_{hop}$ subframes (e.g., every 4 subframes), such that all devices operate according to coordinated frequency hopping patterns. For example, a frequency hopping pattern may refer to a pattern or ordered list of frequency ranges, center frequencies, or bandwidth regions, with respect to which devices may hop between or transition amongst for communications (e.g., every $N_{hop}$ subframes, devices may frequency hop or transition radio frequency (RF) communications circuitry according to the frequency hopping pattern, to achieve frequency diversity).

MTC UEs may use narrowband operation within a wider system bandwidth that may be associated with another protocol (e.g., LTE protocol or NR protocol). As discussed above, for eMTC in-band operation in an NR carrier, the resources used by eMTC may be configured as reserved resources for NR rate matching. For example, resources of bandwidth reduced SIB1 (SIB1-BR) may be configured as semi-static rate matching resources, as the time and frequency location may be fixed for a given LTE eMTC cell (e.g., resources for eMTC SIB1 may be configured as semi-static rate matching resources, as these resources may have fixed time and frequency location). However, such semi-static resource partitioning between NR and eMTC may result in resources dedicated to eMTC (e.g., narrowband regions 210 dedicated to UE 115-a) being unusable for NR. NR UEs may assume data transmitted on these reserved resources will be rate matched, and may use reserved resources for rate matching, but otherwise the reserved resources may be unusable for NR communications. As such, a tradeoff may exist between allocating more narrowband regions 210 for eMTC (e.g., which may allow for support of more MTC devices, provide for increased gains from more diverse frequency hopping, paging may be distributed on more narrowband, etc.) and preserving more resources for NR (e.g., which results in less narrowband regions 210 for eMTC). Further, resources for paging MPDCCH and other downlink transmissions may be configured as rate matching resources (e.g., NR rate matching resources) via L1 indications in DCI. As such, as the number of narrowband regions 210 for eMTC increases, the DCI overhead to convey such reserved resources for NR rate matching may also increase.

The techniques described herein may provide for dynamic resource sharing between eMTC and NR. That is, the network (e.g., base station 105-*a*) may indicate a set of valid narrowbands for eMTC (e.g., a first protocol) in order to balance allocation of MTC narrowband regions 210 and resource preservation for NR. Further, eMTC paging and data traffic may be bursty and the number of MTC devices to be allocated resources may vary over time. The described techniques may further provide for efficient resource sharing as the set of valid narrowbands for eMTC may, from time to time, be expanded (e.g., to include more narrowbands) or decreased (e.g., to include fewer narrowbands), depending on eMTC and/or NR needs. That is, the amount of resources allocated to eMTC (e.g., the size of the valid set of narrowband regions 210 or the number of narrowbands included in the valid set of narrowband regions 210) may be dynamically adjusted depending on the scenario, as the amount of eMTC traffic varies depending on the bursty nature of some eMTC traffic, the number of MTC devices in the system, etc. Additionally or alternatively, NR considerations (e.g., such as NR pending traffic, DCI overhead associated with L1 indications of rate matching reserved resource sets corresponding to eMTC narrowbands, the number of NR devices in the system, etc.) may also be taken into account in determining the set of valid narrowband resources.

In some examples, the narrowband regions 210 for eMTC (e.g., the number of narrowbands indicated in the set of valid narrowbands) may be reduced or minimized when coexisting with NR on the same band. When a system bandwidth (e.g., a large LTE system bandwidth, such as 5/10/15/20 MHz) is signaled to an eMTC UE (e.g., UE 115-*a*), a set of valid narrowbands for eMTC may also be signaled (e.g., for MPDCCH/PDSCH/PUSCH). The indicated set of valid narrowbands may limit the narrowband regions 210 available for eMTC (e.g., when the carrier 205 is associated with an NR protocol). In some cases, the set of valid narrowband indicated for uplink and downlink may be different. In some examples, a set of valid narrowbands (e.g., for uplink, downlink, or both) may be indicated via a bitmap (e.g., where a value '0' indicates invalid and a value '1' indicates valid). In some cases, the bitmap may be signaled with one bit per narrowband or one bit per wideband. In cases of a valid wideband bitmap, one bit may correspond to a number (e.g., three, four, five, six) of consecutive (e.g., multiple and adjacent) narrowbands corresponding to the wideband (e.g., narrowbands within a wideband may either all be valid or all be invalid). For example, four widebands may be defined, each including four consecutive narrowbands (e.g., wideband1 may include narrowbands 0-3, wideband2 may include narrowbands 4-7, wideband3 may include narrowbands 8-11, and wideband4 may include narrowbands 12-15). As an example, a valid wideband bitmap may be used for a category 'M2' UE supporting a large bandwidth (e.g., of 5 MHZ).

In some cases, the set of valid narrowbands may be subframe specific (e.g., as PSS/SSS/PBCH and SIB1-BR may be associated with certain slots and subframes). For example, if the narrowband overlapping with the 72 center subcarriers (e.g., the center 72 subcarriers of a system bandwidth) is indicated as valid for MPDCCH/PDSCH then the narrowband overlapping with the 72 center subcarriers may be indicated as invalid in subframes used for PSS/SSS/PBCH (e.g., subframe #4 and #9 for FDD). The invalid subframe configuration for each narrowband may also be based on NR (e.g., to avoid collision or interference with NR sync channels and other NR channels). That is, valid subframe configuration in eMTC may be extended to be narrowband specific for improved coexistence with NR on the same band. For example, valid subframe configurations may be extended to indicate what narrowbands are valid for the subframes indicated by the valid subframe configuration. In some cases, the valid subframe configuration may be different for each narrowband (e.g., for each valid narrowband).

For backwards capability, the same system bandwidth (e.g., the system bandwidth of carrier 205) may be signaled to legacy eMTC UEs (e.g., MTC devices not capable of receiving, supporting, or understanding indications of valid narrowband sets). However, such legacy eMTC UEs may be configured to not perform frequency hopping for MPDCCH/PDSCH for paging, as described further below with reference to FIG. 3.

In cases where frequency hopping is used, the frequency hopping may occur only on the set of valid narrowbands. For example, UE 115-*a* (e.g., eMTC devices supporting valid narrowband sets) may frequency hop within a numerology associated with the valid set of narrowbands, and may not hop to frequencies or narrowbands outside of the indicated valid set of narrowbands. Legacy eMTC UEs may still support frequency hopping for random access and unicast transmissions, however the legacy eMTC UEs (e.g., eMTC UEs that divide an indicated system bandwidth into narrowbands and are not aware of frequency regions preserved for NR, or non-valid narrowbands for eMTC) may be configured with a different frequency hopping pattern (e.g., different than the frequency hopping pattern indicated to UE 115-*a* that assumes use of a numerology associated with the valid set of narrowbands). The different frequency hopping pattern (e.g., the different hopping narrowband offset) for the legacy UEs may ensure the legacy UEs hop within the set of valid narrowbands. For example, the frequency hopping pattern for legacy UEs may be determined based on a numerology assumed by the legacy eMTC UE (e.g., assuming all narrowbands within the system bandwidth are available), however the pattern may ensure the narrowbands used are one of the valid narrowbands.

Base station 105-*a* may indicate a reduced narrowband set (e.g., a valid set of narrowbands) for eMTC with UE 115-*a*. For example, the network (e.g., a base station) may identify a valid set of narrowbands within a carrier associated with another protocol (e.g., within an NR carrier), and may configure UE 115-*a* frequency hopping within the valid set to effectively reduce narrowbands used by eMTC when coexisting with NR in the same band. UE 115-*a* may receive the indication of the valid set, as well as a frequency hopping pattern, and may receive MPDCCH and PDSCH within (e.g., across) the valid set of narrowbands according to the frequency hopping pattern. For example, UE 115-*a* may receive an indication (e.g., a bitmap) from base station 105-*a* indicating a valid set of narrowbands.

In cases where an MTC device is not capable of receiving and employing valid sets of narrowbands (e.g., legacy MTC devices), the MTC device may be configured with a second frequency hopping pattern (e.g., different from the frequency hopping pattern associated with the valid set of narrowbands that may be indicated to UE 115-*a*) to be implemented for reception of PDSCH. The second frequency hopping pattern may effectively allocate narrowbands for the legacy MTC device that are within the valid set of narrowbands indicated to UE 115-*a*. That is, legacy MTC device not capable of employing valid sets of narrowbands (e.g., MTC devices that determine narrowband numerology solely on carrier system bandwidth) may be configured with a frequency hopping pattern that ensures the legacy MTC device skips non-valid narrowbands. Legacy MTC devices may be configured to not employ frequency hopping for reception of MPDCCH.

In some cases, eMTC may be misaligned with a resource grid (e.g., an NR resource grid). For example, in some cases, eMTC may be aligned with a resource grid associated with LTE protocol. In cases where the carrier (e.g., including the in-band eMTC) is associated with NR, the eMTC resource grid may be offset (e.g., in subcarriers, RBs, or both) from the NR resource grid. For example, a direct current (DC) subcarrier may be modulated in NR, and not in LTE downlink (e.g., which may result in the offset between the LTE-eMTC RB grid and the NR RB grid, even though the LTE-eMTC subcarrier grid and the NR subcarrier grid may be aligned). Further, due to the "floating" sync block used in NR, it is also possible that the narrowband for eMTC may be offset by some arbitrary number of subcarriers (e.g., from 0 to 11 subcarriers) relative to the NR RB grid. For example, NR may use a "floating" sync block where the PRB for the sync block may not be aligned with the PRB for the data block, which may result in the subcarrier offset. In some cases, offsets may be different for a lower half of eMTC narrowbands within the system bandwidth (e.g., narrowbands with lower frequencies than a center subcarrier associated with the system bandwidth), than for an upper half of eMTC narrowbands (e.g., due to the unused DC subcarrier in LTE).

Additionally or alternatively, the described techniques may further provide for alignment of eMTC RB grid and NR RB grid, alignment of eMTC narrowbands with NR RBG, or both. For example, the network (e.g., a base station) may identify a subcarrier offset, a RB offset, or both, and may transmit a frequency alignment parameter to the MTC device. The MTC device may receive the frequency alignment parameter (e.g., a subcarrier offset, a RB offset, etc.) and may align one or more narrowbands accordingly. As such, the eMTC RB grid and NR RB grid may be aligned, which may allow for dynamic resource sharing between eMTC and NR based on the scheduling (e.g., instead of rate matching based on reserved resources). That is, NR RBGs overlapping with MPDCCH/PDSCH may not be allocated to NR UEs by the scheduler.

Figure 3:
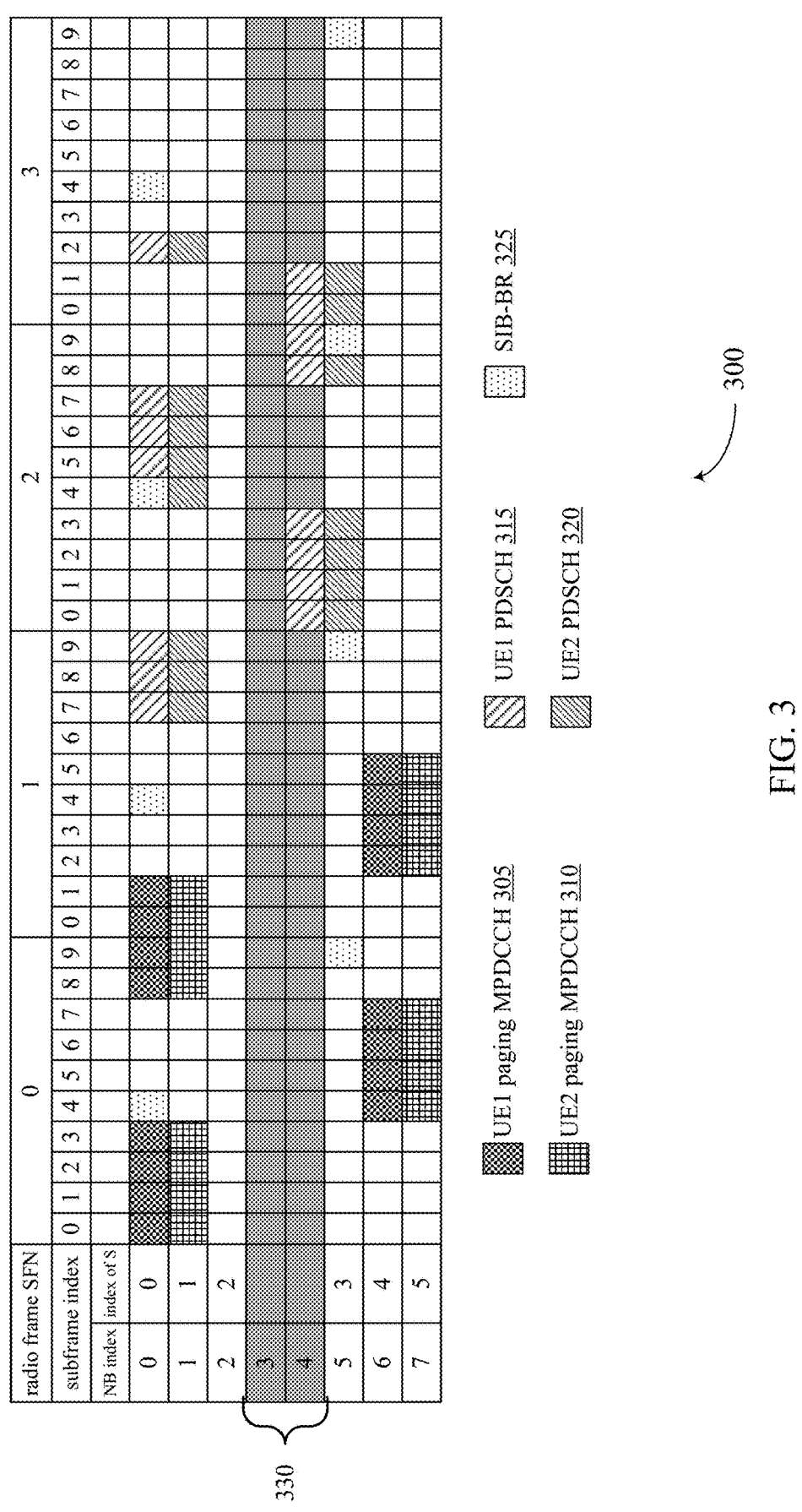
FIGS. 3 and 4 illustrate examples of frequency hopping schemes that support flexible resource allocation for narrowband and wideband coexistence in accordance with aspects of the present disclosure.

FIG. 3 illustrates an example of a frequency hopping scheme 300 that supports flexible resource allocation for narrowband and wideband coexistence (e.g., where more narrowbands may be reserved for eMTC) in accordance with aspects of the present disclosure. In some examples, frequency hopping scheme 300 may implement aspects of wireless communications system 100 and wireless communications system 200. For example, frequency hopping scheme 300 may illustrate scheduling of MPDCCH, PDSCH, and SIB1-BR, which may implement aspects of frequency hopping in accordance with aspects of the present disclosure. Specifically, frequency hopping scheme 300 may illustrate scheduling or downlink transmissions for two UEs 115 (e.g., UE1 and UE2), including which narrowbands may be scheduled with UE1 paging MPDCCH 305, UE2 paging MPDCCH 310, UE1 PDSCH 315, UE2 PDSCH 320, and SIB1-BR 325 over different subframes.

In some cases, the frequency hopping pattern for downlink may be dependent on the information being transmitted (e.g., eMTC frequency hopping may be channel specific or dependent on the transmitted information). For example, SIB1-BR 325 may be associated with hopping between two narrowbands (e.g., for system bandwidths between 12-50 RBs) or four narrowbands (e.g., for system bandwidths between 51-110 RBs). The two narrowbands overlapping with the 72 center subcarriers (e.g., narrowband region 330) may be excluded from frequency hopping. That is, narrowband region 330 may be not be available for SIB1-BR. The starting narrowband (e.g., the default or initial narrowband) index may be determined based on the cell ID (e.g., the initial location of the SIB1-BR may depend on the cell ID associated with the SIB1-BR). For paging MPDCCH, the same set of narrowband for SIB1-BR may be used (e.g., two narrowbands overlapping with the 72 center subcarriers, or the narrowband region 330, may be excluded from frequency hopping for paging MPDCCH). For paging MPDCCH, the starting narrowband index may be determined based on both cell ID and UE ID (e.g., UE1 paging MPDCCH 305 beginning on narrowband0 and UE2 paging MPDCCH 310 beginning on narrowband1 may be a function of the different UE IDs of UE1 and UE2). For other downlink data transmission (e.g., PDSCH) frequency hopping may be between two narrowbands or four narrowbands based on a per cell configuration. The starting narrowband may be either semi-statically configured (e.g., by higher or upper layers) or dynamically indicated in DCI (e.g., L1 signaling). All the narrowbands of the carrier (e.g., an LTE carrier) may be valid for frequency hopping, including narrowband region 330.

As discussed above, narrowband region 330 may not be available for SIB1-BR or paging MPDCCH frequency hopping, but may be available for PDSCH frequency hopping. A plurality of narrowbands associated with a system bandwidth may each be associated with a NB index. In the present example, a 10 MHz carrier may be divided into 8 narrowbands, with NB indices from 0-7. However, for SIB1-BR or paging MPDCCH, narrowbands associated with NB indices 3 and 4 (e.g., the 72 center subcarriers) may not be available, such that a second set of narrowbands (e.g., the plurality of narrowbands excluding narrowbands 3 and 4) may be associated with indices 0-5.

Frequency hopping scheme 300 may illustrate eMTC downlink transmission using 7 out of 8 narrowbands of a 10 MHz LTE carrier (e.g., narrowband 3 may not be used in the preset example). The 10 MHz system bandwidth may include 50 PRBs, from which 8 narrowbands may be identified (e.g., with each narrowband including 6 PRBs). There may be 6 valid narrowbands for SIB1-BR and paging MPDCCH, as SIB1-BR and paging MPDCCH may not utilize narrowband region 330 for frequency hopping. The starting index for UE1 paging MPDCCH 305 and UE2 paging MPDCCH 310 may depend on the UE IDs associated with UE1 and UE2. The narrowband offset may further be dependent on the cell ID. For example, assuming a physical cell identification (PCID) of 0, PCID=0 and j=(PCID mod K)=0 for cell specific narrowband offset. In some cases, SIB1-BR may be associated with 16 time domain repetitions, and may thus be transmitted on subframe #4 and subframe #9 of every radio frame (e.g., for a transmit periodicity of 80 ms, SIB1-BR map frequency hop every 5 subframes). For paging MPDCCH, the starting narrowband index may be narrowband1 for UE1 and narrowband2 for UE2 based on the UE ID associated with UE1 and UE2. For PDSCH, the starting narrowband index may be the same as that of the corresponding MPDCCH (e.g., PDSCH and MPDCCH may be associated with the same starting narrowband, which may depend on the UE ID). For MPDCCH and PDSCH, frequency hopping may be carried out between 2 narrowbands and in blocks of four subframes (e.g., $N_{hop}$=4) with a hopping offset of 4 narrowbands (e.g., freqHoppingOffset=4), according to a per cell configuration (e.g., interval-DLHopping=4, freqHoppingOffset=4, and #HoppingNB=2).

As can be seen, both MPDCCH and PDSCH have a frequency offset of four narrowbands for frequency hopping. However, due to the different narrowbands available (e.g., MPDCCH may not use narrowbands of narrowband region 330, whereas PDSCH may), the narrowbands used for hopping may differ, even though both MPDCCH and PDSCH are associated with a same starting index and a same frequency offset for hopping. That is, the set of narrowbands for MPDCCH frequency hopping may be different from the set of narrowbands for PDSCH frequency hopping (e.g., the hopping pattern for paging MPDCCH may be different from the hopping pattern for paging PDSCH as the narrowbands overlapping with the 72 center subcarriers may not be used for paging MPDCCH but may be used for PDSCH). In some cases, this may result in undesirable amount of resources utilized for eMTC (e.g., as 7 out of 8 narrowbands may be used for two MTC UEs). In some cases, a subframe gap (e.g., subframe #6 of SFN1) may exist between scheduling of MPDCCH and PDSCH to allow UEs (e.g., UE1 and UE2) to decode MPDCCH.

Figure 4:
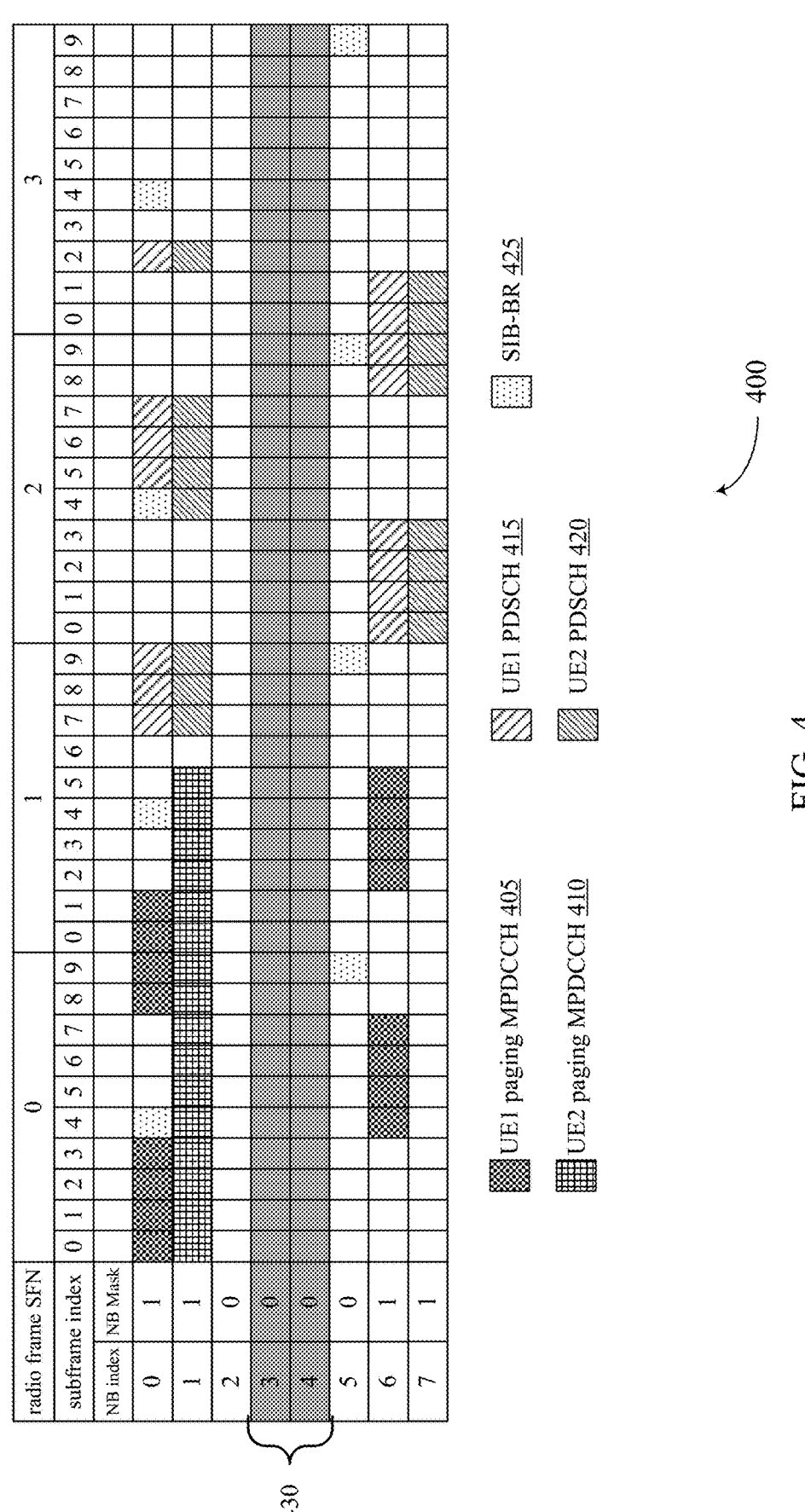

FIG. 4 illustrates an example of a frequency hopping scheme 400 that supports flexible resource allocation for narrowband and wideband coexistence in accordance with aspects of the present disclosure. In some examples, frequency hopping scheme 400 may implement aspects of wireless communications system 100 and wireless communications system 200. For example, frequency hopping scheme 400 may illustrate scheduling of MPDCCH, PDSCH, and SIB1-BR, which may implement aspects of valid narrowband frequency hopping in accordance with aspects of the present disclosure. Specifically, frequency hopping scheme 400 may illustrate scheduling or downlink transmissions for two UEs 115 (e.g., UE1 and UE2), including which narrowbands may be scheduled with UE1 paging MPDCCH 405, UE2 paging MPDCCH 410, UE1 PDSCH 415, UE2 PDSCH 420, and SIB1-BR 425 over different subframes.

Frequency hopping scheme 400 may be similar to frequency hopping scheme 300, in that frequency hopping scheme 400 may be associated with a 10 MHZ system bandwidth, of which 8 narrowbands may be identified for eMTC. However, for frequency hopping scheme 400, UE1 may be assumed to support sets of valid narrowbands (e.g., for eMTC), and UE2 may be assumed to be a legacy UE (e.g., UE2 may not support sets of valid narrowbands). Frequency hopping scheme 400 may illustrate 4 valid narrowbands (e.g., narrowband0, narrowband1, narrowband6, and narrowband7), and 4 non-valid (or preserved for NR) narrowbands (e.g., narrowband2, narrowband3, narrowband4, and narrowband5). In some cases, UE1 may receive an indication (e.g., a bitmap) from a base station indicating the valid set of narrowbands. For example, UE1 may, in some cases, determine a narrowband numerology based on the indication, whereas UE2 (e.g., a legacy UE) may assume all narrowbands (e.g., UE2 may determine a narrowband numerology assuming all narrowbands 0-7).

As such, UE1 and UE2 may be configured with a different frequency hopping pattern (e.g., assuming different narrowband numerologies), to ensure UE1 and UE2 frequency hop within the valid set of narrowbands. For example, UE1 be configured with a frequency hopping offset of 2 narrowbands, and the UE1 may identify a frequency hopping pattern between narrowband0 and narrowband6 (e.g., as per the valid narrowband numerology, narrowband6 is associated with a 2 narrowband offset form narrowband0). The frequency hopping offset may be used for both MPDDCH and PDSCH. However, UE2 may be configured to not frequency hop for MPDCCH (e.g., UE2 may receive MPDCCH over narrowband 1). Further, for PDSCH, UE2 may receive a frequency hopping offset of 6 narrowbands, and UE2 may thus identify a frequency hopping pattern between narrowband1 and narrowband7. As such, UE1 and UE2 may be configured with frequency hopping such that all eMTC (e.g., associated with UE1 and UE2) is within the valid set of narrowbands. That is, UE1 (e.g., a new eMTC UE) and UE2 (e.g., a legacy MTC UE) may be configured with different frequency hopping offsets, in order to accommodate for the different sets of narrowbands used by each UE (e.g., as the UE1 may be configured with a valid set of narrowbands numerology and UE2 may still assume an original numerology based on the total system bandwidth). As such, the two narrowbands overlapping with the 72 center subcarriers (e.g., narrowband region 430) may be effectively excluded from frequency hopping via implementation of such different frequency hopping offset configurations.

Figure 5:
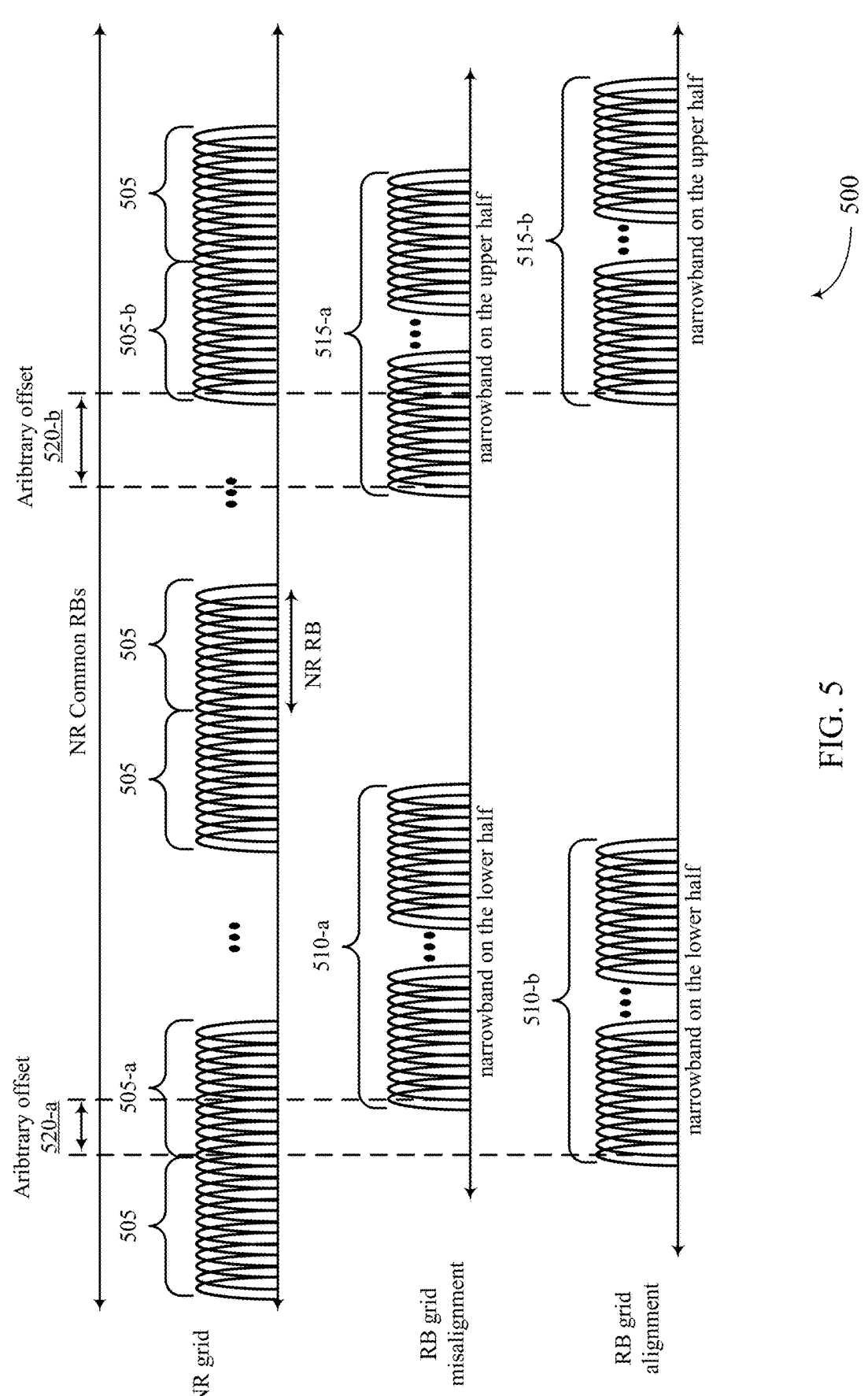
FIGS. 5 through 7 illustrate examples resource grid alignment schemes that support flexible resource allocation for narrowband and wideband coexistence in accordance with aspects of the present disclosure.

FIG. 5 illustrates an example of a resource grid alignment scheme 500 that supports flexible resource allocation for narrowband and wideband coexistence in accordance with aspects of the present disclosure. In some examples, resource grid alignment scheme 500 may implement aspects of wireless communications system 100 and wireless communications system 200. Specifically, resource grid alignment scheme 500 may illustrate an adjustment for a subcarrier offset between an eMTC RB grid (e.g., an LTE-eMTC RB grid) and a NR RB grid.

In some cases, an NR RB 505 may be offset (e.g., according to some arbitrary offset 520) from a narrowband. For example, an NR RB 505-*a* may be offset from narrowband 510-*a* (e.g., a narrowband on the lower half of the carrier, or a narrowband associated with a lower frequency than a center subcarrier of the system bandwidth) by some subcarrier offset 520-*a*. In some cases, a narrowband 515-*a* (e.g., a narrowband on the upper half of the carrier, or a narrowband associated with a higher frequency than a center subcarrier of the system bandwidth) may be associated with a different offset from the NR resource grid (e.g., from an NR RB 505-*b*) due to, for example, DC carrier modulation in NR. For example, NR RB 505-*b* may be offset from narrowband 515-*a* by some subcarrier offset 520-*b* (e.g., which may be different from subcarrier offset 520-*a*). In other cases, subcarrier offset 520-*a* and subcarrier offset 520-*b* may be the same.

A base station may transmit a frequency alignment parameter that may indicated one or both of subcarrier offset 520-*a* and subcarrier offset 520-*b* to a UE. The UE may align one or more narrowbands according to the indicated frequency alignment parameter. For example, a UE may align the narrowband (e.g., or shift frequency of downlink monitoring for reception of MPDCCH, PDSCH, etc.). For example, the UE may shift narrowband 510-*a* to resemble the alignment of narrowband 510-*b* (e.g., which may then be aligned with the NR resource grid).

Figure 6:
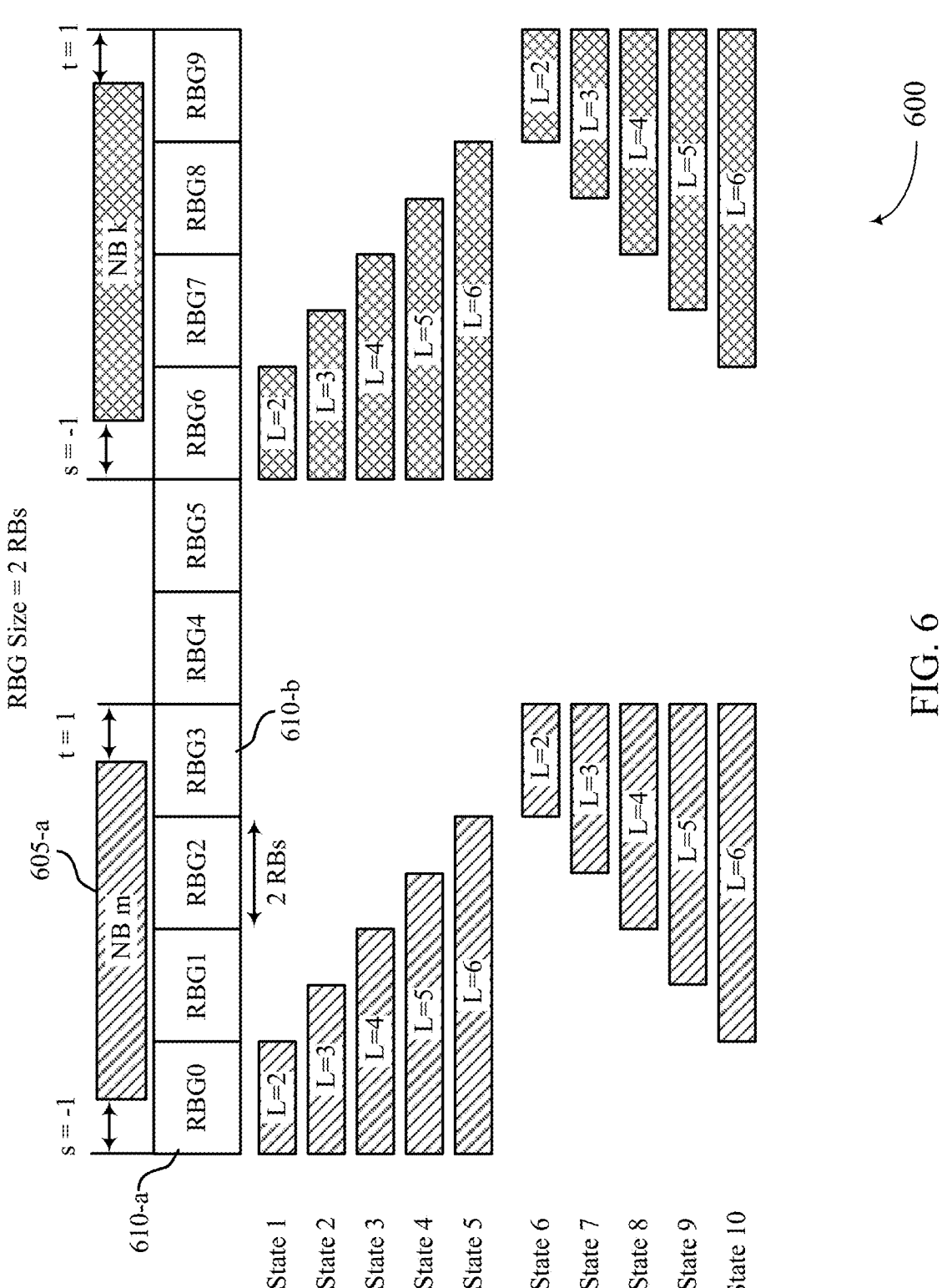

FIG. 6 illustrates an example of a resource grid alignment scheme 600 that supports flexible resource allocation for narrowband and wideband coexistence in accordance with aspects of the present disclosure. In some examples, resource grid alignment scheme 600 may implement aspects of wireless communications system 100 and wireless communications system 200. Specifically, resource grid alignment scheme 600 may illustrate an adjustment for a RB offset between an eMTC resource grid (e.g., an LTE-eMTC resource grid) and a NR RBG.

For example, a frequency alignment parameter (e.g., signaled from a base station to an MTC UE in order for the MTC UE to align an eMTC resource grid with an NR resource grid) may include a RB shift for aligning a start of a narrowband with a NR RBG (e.g., an 's' value), a RB shift for aligning an end of a narrowband with a NR RBG (e.g., a 't' value), or both. An 's' value may refer to a RB offset from a narrowband 605 to the beginning or start of a NR RBG 610. A 't' value may refer to a RB offset from a narrowband 605 to the end of a NR RBG 610. In some cases, 's' and 't' values may be used along with DCI resource grid alignment state signaling to indicate a narrowband alignment. For example, DCI may be used to indicate resource grid alignment states. A resource grid alignment state may indicate a length of a resource allocation (e.g., a number of PRBs allocated within the narrowband) as well as an index of the starting PRB of the allocated resource (e.g., the resource grid alignment state may indicate 's' as the start PRB of a NR RBG where the first PRB of the narrow band is located or 't' as the end PRB of the NR RBG where the last PRB of the narrow band is located). An example of possible resource grid alignment states is shown below in Table 1.

TABLE 1

| Resource Grid Alignment State | Index of starting PRB of the allocated resource | Number of PRBs allocated |
|---|---|---|
| State 1 | s | 2 |
| State 2 | s | 3 |
| State 3 | s | 4 |
| State 4 | s | 5 |
| State 5 | s | 6 |
| State 6 | t-1 | 2 (ending at PRB t) |
| State 7 | t-2 | 3 (ending at PRB t) |
| State 8 | t-3 | 4 (ending at PRB t) |
| State 9 | t-4 | 5 (ending at PRB t) |
| State 10 | t-5 | 6 (ending at PRB t) |

For example a resource grid alignment state 1 may indicate narrowband 605-a has a length of two RBs, and that the UE should align the narrowband 605-a on the start of NR RBG 610-a (e.g., which may result in the UE shifting the narrowband 605-a by one RB (as s=−1). As another example, a resource grid alignment state 7 may indicate narrowband 605-a has a length of three RBs, and that the UE should align the narrowband 605-a on the end of NR RBG 610-b (e.g., which may result in the UE shifting the narrowband 605-a by one RB (as t=1 and thus t−2=−1). In general, for resource allocation for narrowband alignment with NR RBG (e.g., for CE mode A), resource grid alignment states 1-5 indicate the starting PRB is the first PRB of the narrowband with a RB shift of 's.' And resource grid alignment states 6-10 indicate the ending PRB is the last PRB of the narrowband with RB shift of 't.'

That is, narrowbands may be aligned with NR RBGs. In this case, dynamic resource multiplexing with NR may be supported via scheduling (e.g., rather than RM). For example, RBGs overlapping with MPDCCH/PDSCH may not be allocated wo NR UE by the scheduler. RBG definition in NR may be associated with bandwidth part configuration. RBG size may be 2, 4, 6, or 16 RBs depending on the configured bandwidth part size. For RBG size of 2 or 4 RBs, the alignment with NR RBG may be used to minimize the number of unused PRBs due to conflicting alignments of RBG and narrowband. For RBG size of 8 or 16 RBs, the alignment may ensure one narrowband does not span across two RBGs. Otherwise, two RBGs may be unusable for NR when overlapping with one narrowband for eMTC.

If the eMTC narrowband is not aligned with NR RBG, a RB shift may be signaled to align the narrowband with the NR RBG (e.g., align either the start of the narrowband or the end of the narrowband with the RBG). The RB shift values may depend on the NR RBG size which may depend on bandwidth part configuration. The RB shift may also be narrowband specific, since each narrowband may be overlapping with different bandwidth parts. In some cases, the NR RBG size and other parameters may be indicated (e.g., such as the starting PRB of NR) such that the UE may derive the RB shift for each narrowband. In some cases, the RB shift may be explicitly signaled for each narrowband (e.g., two configurable parameters may be indicated per narrowband). That is, a 's' value indicating a RB shift for aligning the start of the narrowband with the NR RBG and a 't' value indicating a RB shift for aligning the end of the narrowband with an NR RBG may be signaled for each narrowband or for narrowbands below the DC subcarrier and for narrowbands above the DC subcarrier. In such cases, the NR RBG size and the association of eMTC narrowband with NR bandwidth part may be transparent to the UE. Such RBG alignment may minimize the number of unused PRBs in NR due to the alignment of the RBG and narrowbands.

If enabling with flexible downlink starting PRB in CE Mode A, the allocation for alignment with NR RBG by using 's' and 't' values may be implemented based on 10 unused states in DCI (e.g., in DCI format 6-1A), as discussed above. If enabling with flexible downlink starting PRB in CE mode B, a 1-bit (on/off) indicator may be used to enable the shift of narrowbands with the shift value equal to either 's' or 't.' The SIB may also indicate the narrowband shift for MPDCCH, at least for unicast. In some cases, for backwards compatibility (e.g., for compatibility with legacy MTC UEs), if MPDCCH is transmitted on a shifted narrowband, then the narrowband may not be used for legacy UEs. The SIB1 indication of NB shift for MPDCCH may not be limited to the narrowbands on NR band. Also, not all narrowbands may need to be signaled with RB shift values of 's' and 't.'

Figure 7:
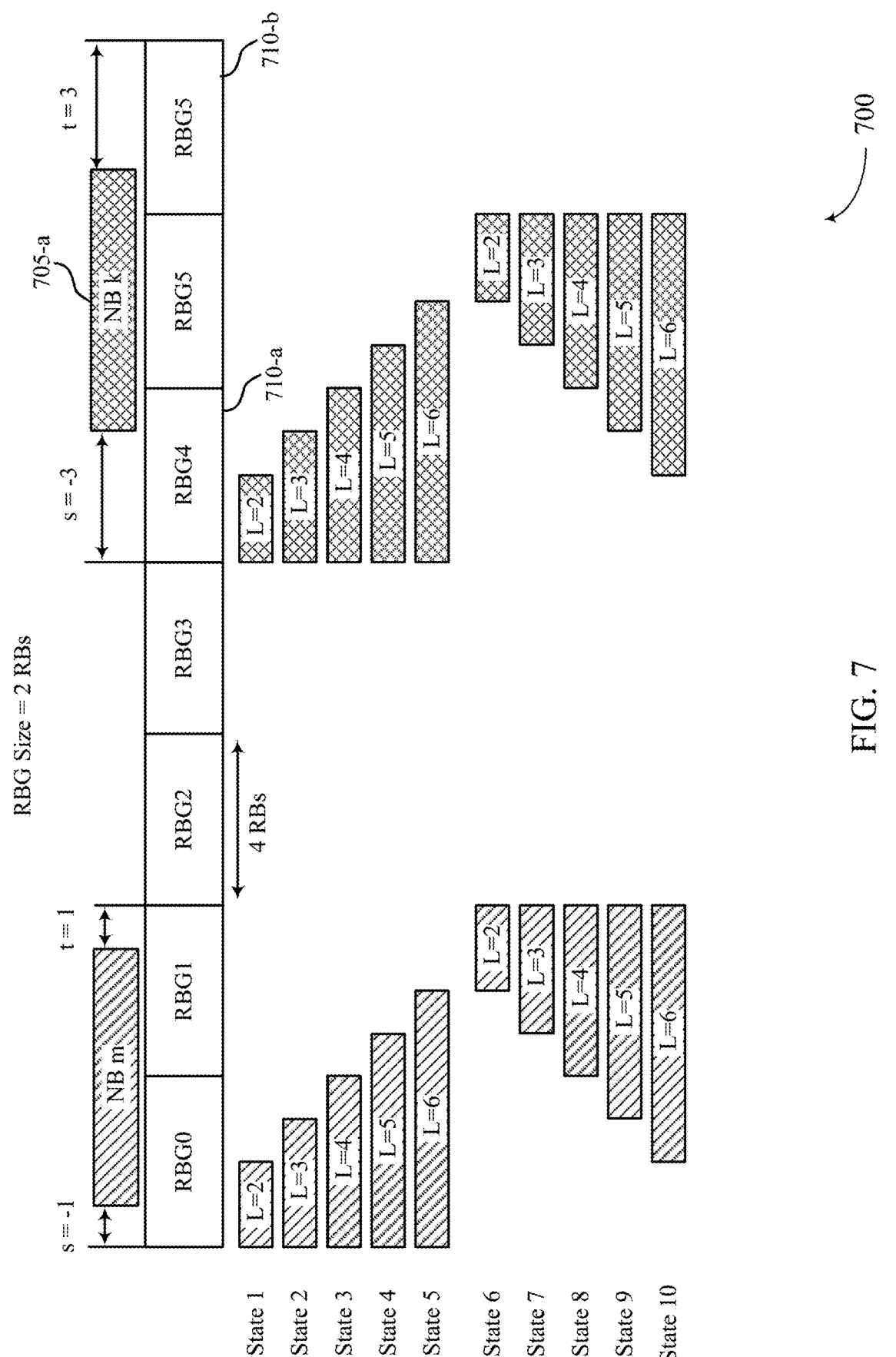

FIG. 7 illustrates an example of a resource grid alignment scheme 700 that supports flexible resource allocation for narrowband and wideband coexistence in accordance with aspects of the present disclosure. In some examples, resource grid alignment scheme 700 may implement aspects of wireless communications system 100 and wireless communications system 200. Specifically, resource grid alignment scheme 700 may illustrate an adjustment for a RB offset between an eMTC resource grid (e.g., an LTE-eMTC resource grid) and a NR RBG.

For example, a resource grid alignment parameter (e.g., signaled from a base station to an MTC UE in order for the MTC UE to align an eMTC resource grid with an NR resource grid) may include a RB shift for aligning a start of a narrowband with a RBG (e.g., an 's' value), a RB shift for aligning an end of a narrowband with a RBG (e.g., a 't' value), or both. An 's' value may refer to a RB offset from a narrowband 705 to the beginning or start of a RBG 710. A 't' value may refer to a RB offset from a narrowband 705 to the end of a RBG 710. In some cases, 's' and 't' values may be used along with DCI resource grid alignment state signaling to indicate a narrowband alignment. For example, DCI may be used to indicate resource grid alignment states. A resource grid alignment state may indicate a length of a narrowband (e.g., a number of PRBs allocated for the narrowband) as well as an index of the starting PRB of the allocated resource (e.g., the resource grid alignment state may indicate 's' as the start PRB of RBG where the first PRB of the narrow band is located or 't' as the end PRB of the RBG where the last PRB of the narrow band is located). As discussed above, an example of possible resource grid alignment states is shown in Table 1.

For example a resource grid alignment state 1 may indicate narrowband 705-*a* has a length of two RBs, and that the UE should align the narrowband 705-*a* on the start of RBG 710-*a* (e.g., which may result in the UE shifting the narrowband 705-*a* by three RB (as s=−3). As another example, a resource grid alignment state 7 may indicate narrowband 705-*a* has a length of three RBs, and that the UE should align the narrowband 705-*a* on the end of RBG 710-*b* (e.g., which may result in the UE shifting the narrowband 705-*a* by one RB (as t=3 and thus 3-2=1). In general, for resource allocation for narrowband alignment with NR RBG (e.g., for CE mode A), resource grid alignment states 1-5 indicate the starting PRB is the first PRB of the narrowband with a RB shift of 's.' And resource grid alignment states 6-10 indicate the ending PRB is the last PRB of the narrowband with RB shift of 't.'

Figure 8:
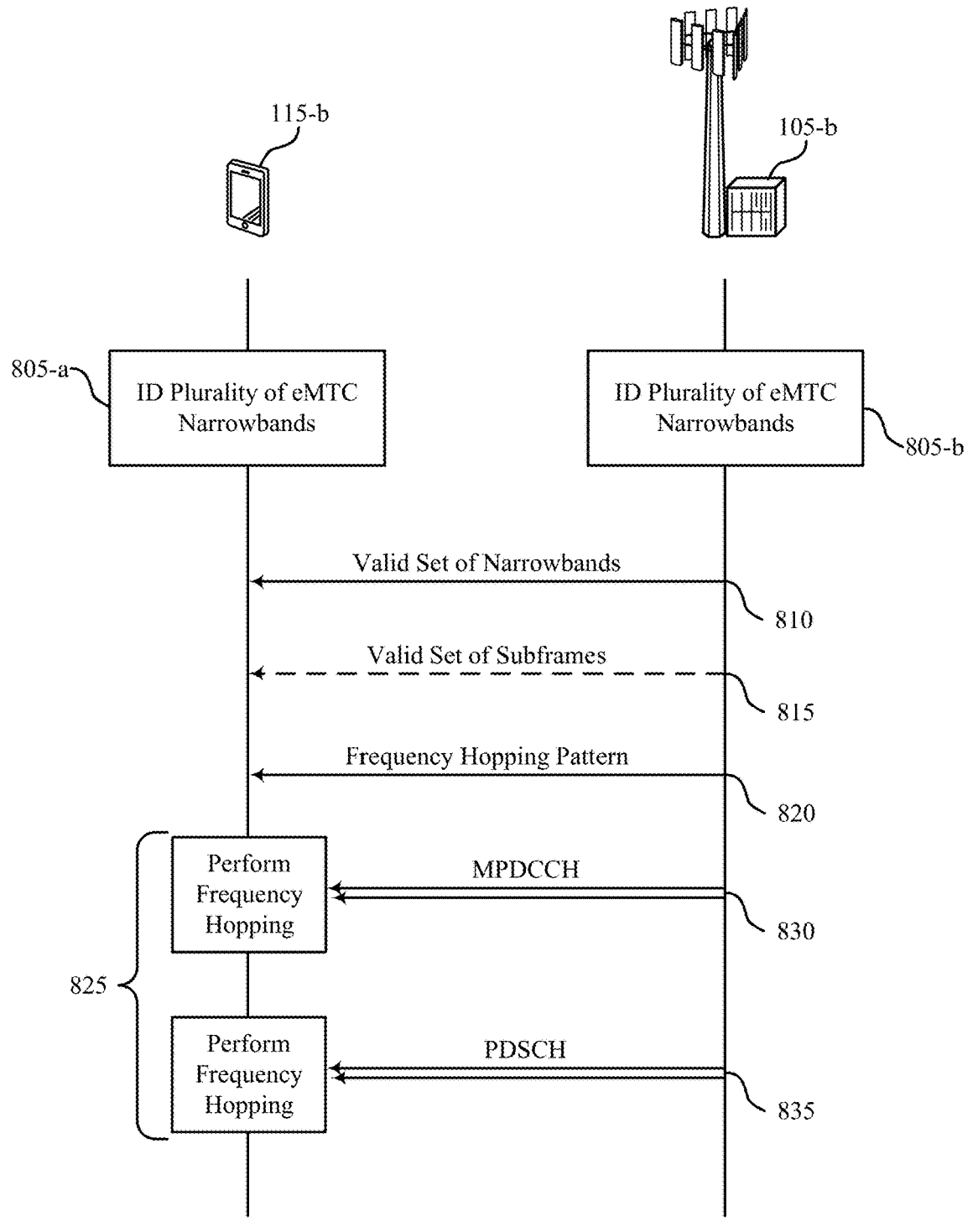
FIGS. 8 and 9 illustrate examples of process flows that support flexible resource allocation for narrowband and wideband coexistence in accordance with aspects of the present disclosure.

FIG. 8 illustrates an example of a process flow 800 that supports flexible resource allocation for narrowband and wideband coexistence in accordance with aspects of the present disclosure. In some examples, process flow 800 may implement aspects of wireless communications system 100 and wireless communications system 200. Process flow 800 includes base station 105-*b* and UE 115-*b* (e.g., an MTC UE), which may be examples of base stations 105 and UEs 115 as described with reference to FIGS. 1 and 2. Process flow 800 may illustrate base station 105-*b* configuring UE 115-*b* with a valid set of narrowbands for eMTC. In the following description of the process flow 800, the operations between the UE 115-*b* and the base station 105-*b* may be transmitted in a different order than the exemplary order shown, or the operations performed by UE 115-*b* and base station 105-*b* may be performed in different orders or at different times. In some cases, certain operations may also be left out of the process flow 800, or other operations may be added to the process flow 800.

At 805-*a*, UE 115-*b* may identify a plurality of narrowbands associated with communication using a first protocol (e.g., associated with eMTC) and, at 805-*b*, base station 105-*b* may identify a plurality of narrowbands associated with communication using a first protocol (e.g., associated with eMTC). For example, UE 115-*b* and base station 105-*b* may identify a system bandwidth associated with a carrier, and may identify the plurality of narrowbands based on the system bandwidth. In some cases, UE 115-*b* and base station 105-*b* may identify the plurality of narrowbands concurrently (e.g., in parallel or at least partially overlapping in time) or at different times (e.g., 805-*a* and 805-*b* may occur simultaneously, or at different times).

At 810, base station 105-*b* may transmit an indication of a set of the plurality of narrowbands that are valid (e.g., a valid set of narrowbands) for the communication using the first protocol. For example, base station 105-*b* may transmit an indication of a valid set of narrowbands for eMTC. The indication of the set of the plurality of narrowbands that are valid may be transmitted, for example, via system information or RRC signaling. In some cases, the valid set of narrowbands may depend on eMTC and NR coexistence considerations. For example, base station 105-*b* may indicate a large set of valid narrowbands in scenarios where a large amount of eMTC traffic (e.g., a large number of MTC devices) is to be scheduled. In other cases, base station 105-*b* may indicate a relatively smaller set of valid narrowbands in scenarios where there is less eMTC traffic, in scenarios where NR traffic takes priority, in scenarios where few eMTC devices are to be scheduled, etc. (e.g., as a smaller set of valid narrowbands may preserve bandwidth, associated with the non-valid narrowbands, for NR). In some cases, the indication of the set of valid narrowbands may include a valid narrowband bitmap or a valid wideband bitmap transmitted to the UE 115-*b*. The valid narrowband bitmap or valid wideband bitmap may include values of '1' indicating valid states and values of '0' indicating invalid states (e.g., the bit map may indicate valid narrowbands or valid wide-bands for eMTC). That is, the bitmap may indicate whether each narrowband of the plurality of narrowbands (e.g., identified at 805) is within the set of the plurality of narrowbands that are valid (e.g., is a valid narrowband) for the communication using the first protocol.

In some cases, at 815, base station 105-*b* may further transmit an indication of one or more subframes that are valid for a narrowband associated with the first protocol (e.g., a valid narrowband for eMTC). For example, as certain signaling (e.g., PSS/SSS/PBCH & SIB1-BR) may only be present in certain subframes, different sets of valid narrowbands may be available for eMTC in different subframes. Further, valid sets of narrowbands may be subframe specific based on NR considerations (e.g., to avoid collision with NR sync channels and other channels that may be differ from subframe to subframe). That is, in some cases, base station 105-*b* may indicate subframe-specific valid narrowband sets (e.g., or narrowband-specific valid subframe sets) to UE 115-*b* for improved coexistence with eMTC and NR on the same band.

At 820, base station 105-*b* may transmit a frequency hopping pattern to UE 115-*b*. In some cases, a frequency hopping pattern may refer to a number of subframes for each hop ($N_{hop}$) (e.g., or a number of subframes before performing a frequency hopping operation), a frequency hopping offset (freqHoppingOffset) (e.g., a number of narrowbands to hop for each hopping operation, an index of a narrow-bands to hop between, etc.), or both. The frequency hopping pattern may configure UE 115-*b* to frequency hop within the set of valid narrowbands indicated at 810. In some cases, the frequency hopping pattern may apply to both MPDCCH and PDSCH downlink transmission.

At 825, UE 115-*b* may perform frequency hopping for a plurality of time domain repetitions of the downlink trans-mission (e.g., across the set of the plurality of narrowbands that are valid for the communication using the first protocol according to the frequency hopping pattern).

For example, at 830, base station 105-*b* may transmit MPDCCH (e.g., one or more repetitions of control messages for paging via MPDCCH) according to the frequency hop-ping pattern indicated at 820. UE 115-*b* may receive the one or more control messages for paging via MPDCCH mapped to the set of the plurality of narrowbands that are valid for the communication using the first protocol, according to the frequency hopping.

At 835, base station 105-*b* may transmit one or more repetitions of a paging message via PDSCH mapped to the set of the plurality of narrowbands, according to the first frequency hopping pattern and the control message for paging (e.g., transmitted by base station 105-*b* at 830). UE 115-*b* may receive, based on the control messaging received at 830, one or more paging messages via PDSCH mapped to the set of the plurality of narrowbands according to the frequency hopping pattern.

Figure 9:
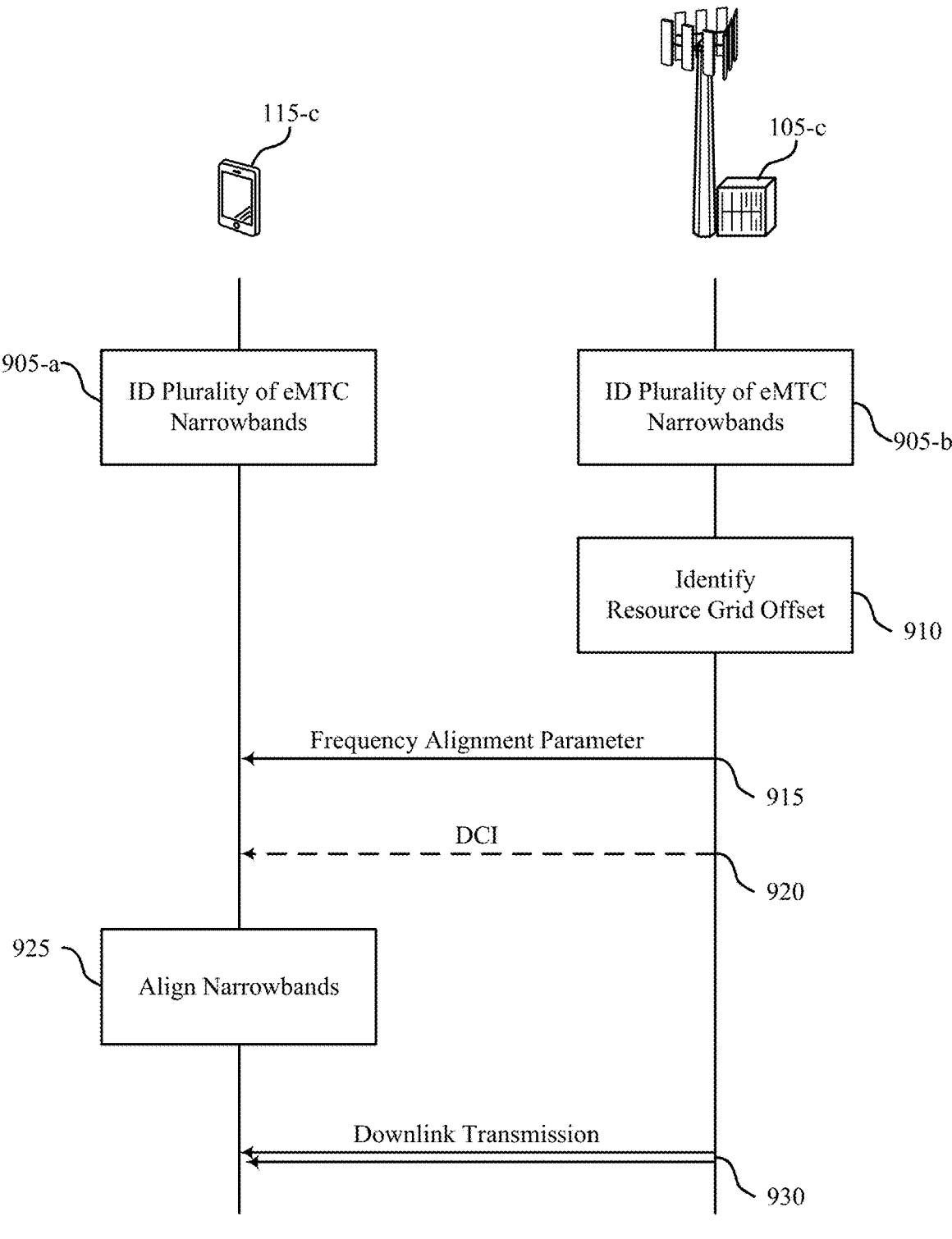

FIG. 9 illustrates an example of a process flow 900 that supports flexible resource allocation for narrowband and wideband coexistence in accordance with aspects of the present disclosure. In some examples, process flow 900 may implement aspects of wireless communications system 100 and wireless communications system 200. Process flow 900 includes base station 105-c and UE 115-c (e.g., an MTC UE), which may be examples of base stations 105 and UEs 115 as described with reference to FIGS. 1 and 2. Process flow 900 may illustrate base station 105-c indicating a frequency alignment parameter (e.g., a resource grid alignment parameter) to UE 115-c, such that UE 115-c may align a plurality of identified narrowbands (e.g., for eMTC) with a resource grid associated with another protocol (e.g., with an NR resource grid). In the following description of the process flow 900, the operations between the UE 115-c and the base station 105-c may be transmitted in a different order than the exemplary order shown, or the operations performed by UE 115-c and base station 105-c may be performed in different orders or at different times. In some cases, certain operations may also be left out of the process flow 900, or other operations may be added to the process flow 900.

At 905-a, UE 115-c may identify a plurality of narrowbands associated with communication using a first protocol (e.g., associated with eMTC) and, at 905-b, base station 105-c may identify a plurality of narrowbands associated with communication using a first protocol (e.g., associated with eMTC). For example, UE 115-c and base station 105-c may identify a system bandwidth associated with a carrier, and may identify the plurality of narrowbands based on the system bandwidth. In some cases, UE 115-c and base station 105-c may identify the plurality of narrowbands concurrently or at different times (e.g., 905-a and 905-b may occur simultaneously, at least partially overlapping in time, or at different times).

At 910, base station 105-c may identify a resource grid offset. For example, base station 105-c may identify an offset between resources (e.g., a resource grid) used for communication using a first protocol (e.g., eMTC protocol) and resources used for communication using a second protocol (e.g., NR protocol). In some cases, the identified resource grid offset may include, or refer to, a subcarrier offset, a resource block offset, or both. For example, base station 105-c may identify a narrowband for eMTC has subcarrier offset from an NR RB grid, may identify a narrowband for eMTC has a RB offset from an NR RBG, or both.

At 915, base station 105-c may transmit a frequency alignment parameter for the communication using the first protocol, where the frequency alignment parameter indicates a frequency resource alignment (e.g., the frequency alignment parameter based on the resource grid offset identified at 910). Frequency alignment parameters may refer to indications of subcarrier offsets (e.g., subcarrier offsets for narrowbands having higher frequencies than some center subcarrier of the system bandwidth, subcarrier offsets for narrowbands having lower frequencies than some center subcarrier of the system bandwidth, etc.), a RB shift for aligning a start of a narrowband with a RBG (e.g., 's' values), a RB shift for aligning an end of a narrowband with a RBG (e.g., 't' values), etc.

In some cases, at 920, base station 105-c may transmit DCI to UE 115-c indicating a state associated with one or more frequency alignment parameters indicated at 915, as described in more detail with reference to FIGS. 6 and 7. For example, in some cases, base station 105-c may indicate a state corresponding to a resource grid alignment state that may reference a length of the narrowband, as well as whether 's' or 't' (e.g., indicated at 915) shall be used by UE 115-c for alignment. That is, base station 105-c may transmit a resource grid alignment state (e.g., via DCI) to UE 115-c indicating a length of a narrowband and whether the UE 115-c is to align the start or end of the narrowband with the RBG. In some cases, the resource grid alignment state signaling (e.g., the state indicated in unused states of DCI used for resource grid alignment) may be referred to as a frequency alignment parameter. That is, in some cases, frequency alignment parameters may refer to all information transmitted by base station 105-c to enable UE 115-c to align a narrowband with a NR resource grid. In other cases, frequency alignment parameters may refer to information used in conjunction with DCI state signaling that enable the UE 115-c to align a narrowband with a NR resource grid.

At 925, UE 115-c may align narrowbands based on the frequency alignment parameter received at 915 (e.g., and in some cases further based on the DCI resource alignment state signaling received at 920). For example, UE 115-c may align one or more narrowbands based on the system bandwidth (e.g., used to identify narrowband numerology and frequency or subcarrier positioning within the system bandwidth) and the frequency alignment parameter received at 915. In some cases, UE 115-c may align the plurality of narrowbands identified at 905-a. In some cases, UE 115-c may align a valid set of narrowbands.

At 930, base station 105-c may transmit one or more downlink transmissions to UE 115-c. The UE 115-c may receive the one or more downlink transmissions according to the one or more narrowbands aligned at 925. For example, UE 115-c may receive a downlink transmission based on the identified plurality of narrowbands and the frequency alignment parameter (e.g., UE 115-c may receive a downlink transmission aligned with the NR resource grid, as the UE 115-c may have aligned a narrowband with the NR resource grid at 925).

Figure 10:
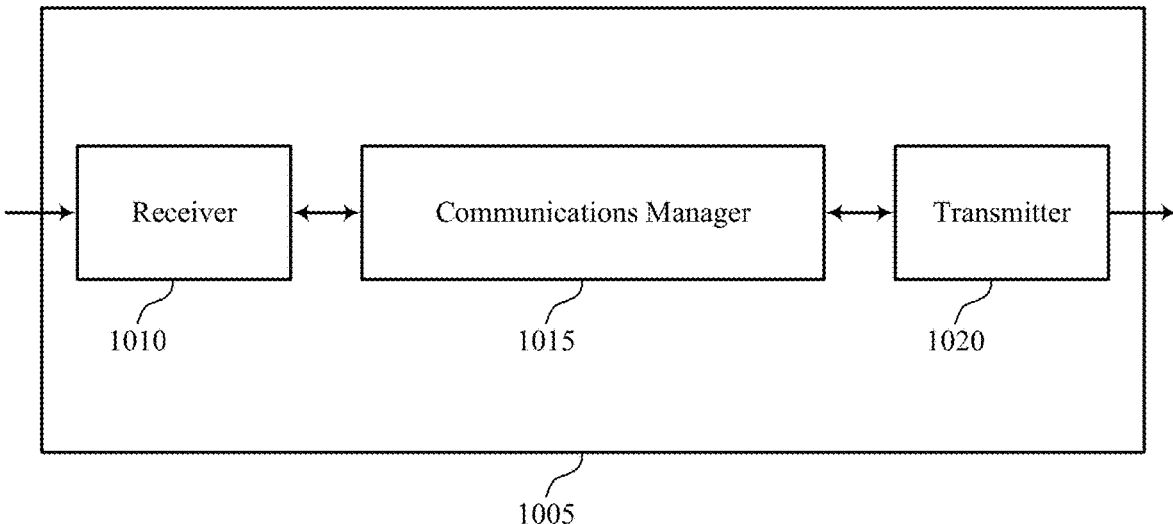
FIGS. 10 and 11 show block diagrams of devices that support flexible resource allocation for narrowband and wideband coexistence in accordance with aspects of the present disclosure.
Figure 10:

FIG. 10 shows a block diagram 1000 of a device 1005 that supports flexible resource allocation for narrowband and wideband coexistence in accordance with aspects of the present disclosure. The device 1005 may be an example of aspects of a UE 115 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to flexible resource allocation for narrowband and wideband coexistence, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify, based on a system bandwidth of a carrier, a set of narrowbands associated with communication using a first protocol, receive an indication of a valid set of narrowbands for the communication using the first protocol, identify a frequency hopping pattern for the communication using the first protocol, and receive a downlink transmission based on frequency hopping for a plurality of time domain repetitions of the downlink transmission across the valid set of narrowbands according to the frequency hopping pattern. The communications manager 1015 may also identify, based on a system bandwidth of a carrier, a set of narrowbands associated with a first protocol, receive a frequency alignment parameter for communication using the first protocol, align the plurality of narrowbands based at least in part on the system bandwidth and the frequency alignment parameter, and receive a downlink transmission based on the aligned set of narrowbands. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
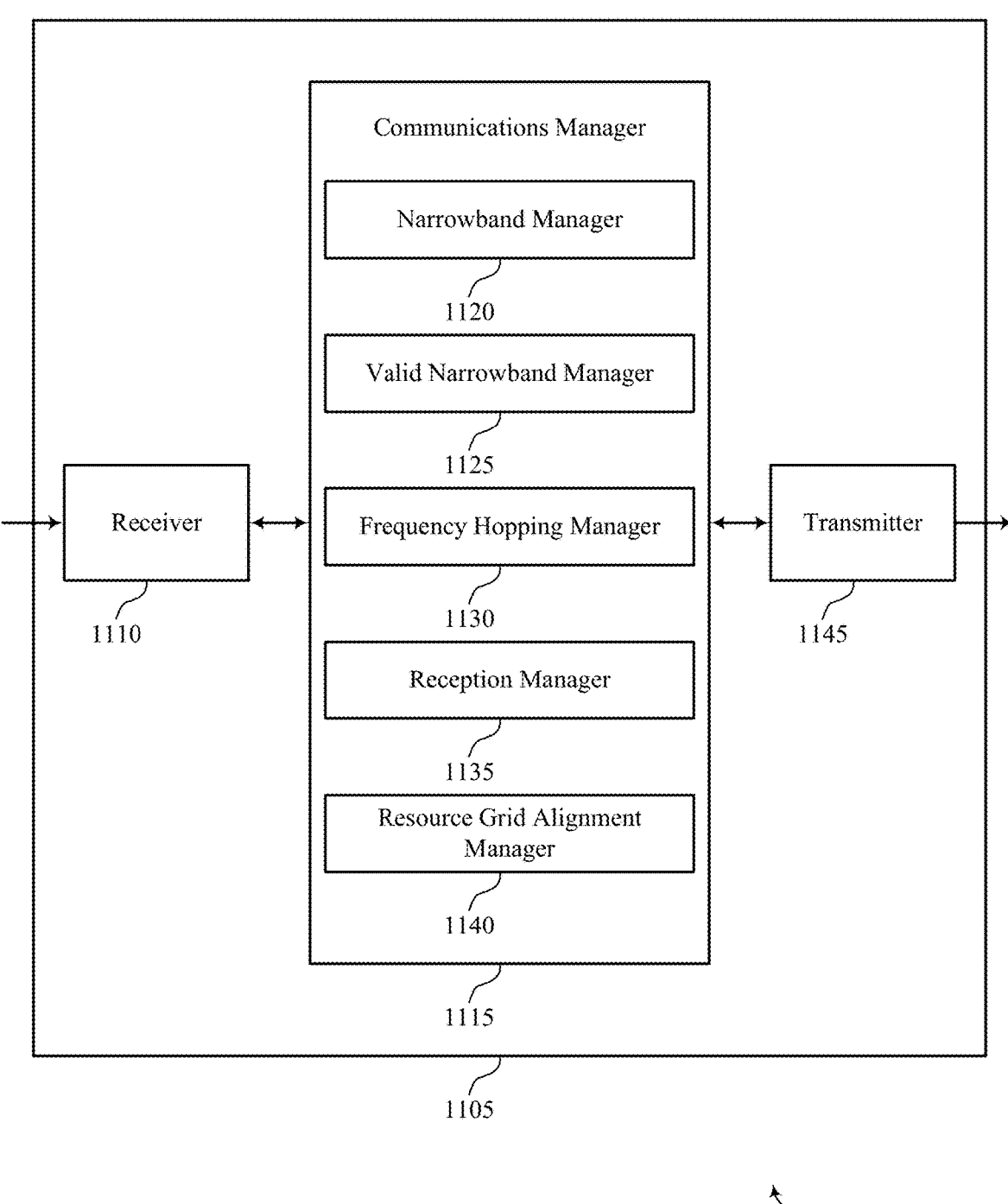

FIG. 11 shows a block diagram 1100 of a device 1105 that supports flexible resource allocation for narrowband and wideband coexistence in accordance with aspects of the present disclosure. The device 1105 may be an example of aspects of a device 1005 or a UE 115 as described herein. The device 1105 may include a receiver 1110, a communications manager 1115, and a transmitter 1145. The device 1105 may also include a processor. Each of these components may be in communication with one another (e.g., via one or more buses).

The receiver 1110 may receive information such as packets, user data, or control information associated with various information channels (e.g., control channels, data channels, and information related to flexible resource allocation for narrowband and wideband coexistence, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a narrowband manager 1120, a valid narrowband manager

1125, a frequency hopping manager 1130, a reception manager 1135, and a resource grid alignment manager 1140. The communications manager 1115 may be an example of aspects of the communications manager 1310 described herein.

The narrowband manager 1120 may identify, based on a system bandwidth of a carrier, a set of narrowbands associated with communication using a first protocol. The valid narrowband manager 1125 may receive an indication of a valid set of narrowbands for the communication using the first protocol. The frequency hopping manager 1130 may identify a frequency hopping pattern for the communication using the first protocol. The reception manager 1135 may receive a downlink transmission based on frequency hopping for a plurality of time domain repetitions of the downlink transmission across the valid set of narrowbands according to the frequency hopping pattern.

The narrowband manager 1120 may identify, based on a system bandwidth of a carrier, a set of narrowbands associated with a first protocol. The resource grid alignment manager 1140 may receive a frequency alignment parameter for communication using the first protocol, and align the plurality of narrowbands based at least in part on the system bandwidth and the frequency alignment parameter. The reception manager 1135 may receive a downlink transmission based on the aligned set of narrowbands.

The transmitter 1145 may transmit signals generated by other components of the device 1105. In some examples, the transmitter 1145 may be collocated with a receiver 1110 in a transceiver module. For example, the transmitter 1145 may be an example of aspects of the transceiver 1320 described with reference to FIG. 13. The transmitter 1145 may utilize a single antenna or a set of antennas.

Figure 12:
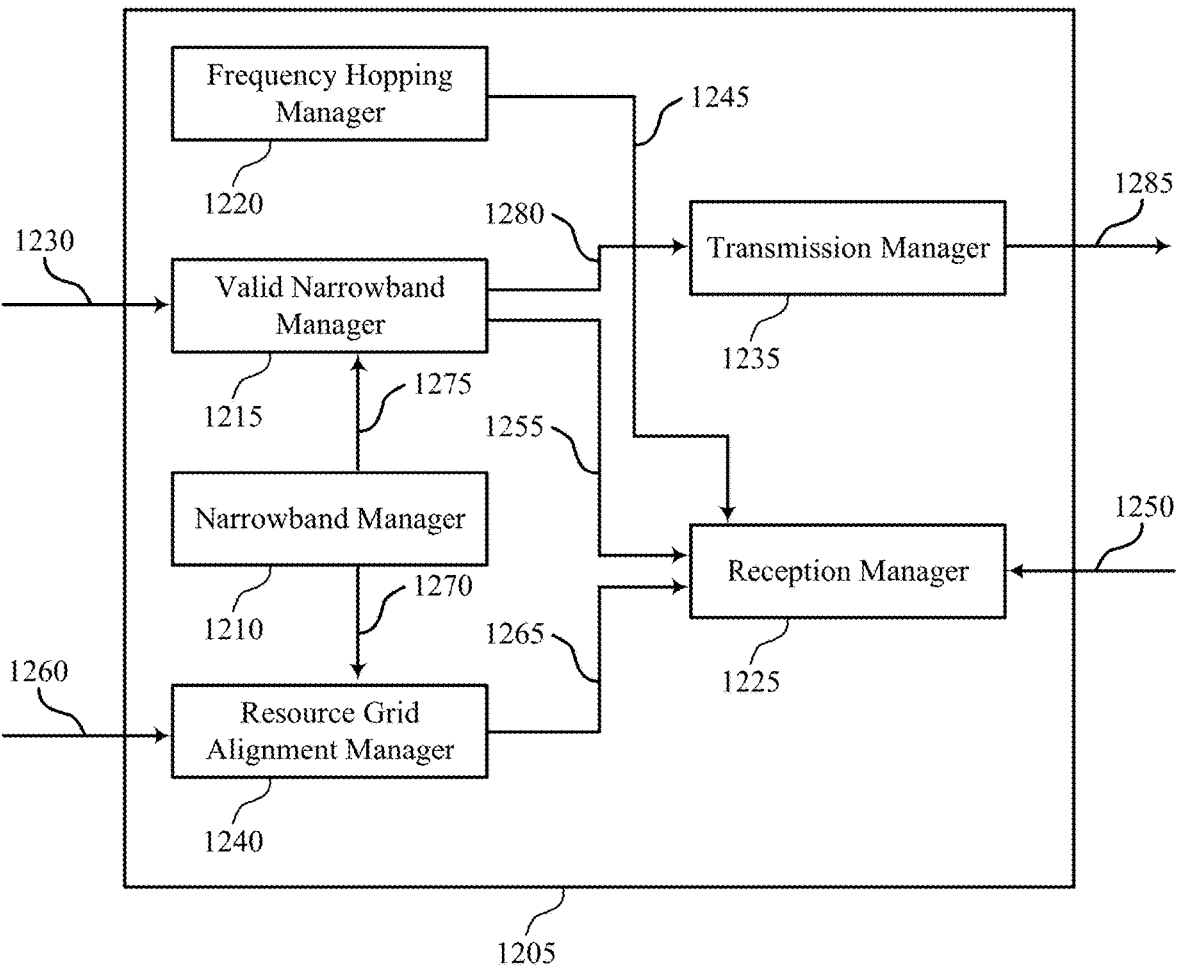
FIG. 12 shows a block diagram of a communications manager that supports flexible resource allocation for narrowband and wideband coexistence in accordance with aspects of the present disclosure.

FIG. 12 shows a block diagram 1200 of a communications manager 1205 that supports flexible resource allocation for narrowband and wideband coexistence in accordance with aspects of the present disclosure. The communications manager 1205 may be an example of aspects of a communications manager 1015, a communications manager 1115, or a communications manager 1310 described herein. The communications manager 1205 may include a narrowband manager 1210, a valid narrowband manager 1215, a frequency hopping manager 1220, a reception manager 1225, a transmission manager 1235, and a resource grid alignment manager 1240. Each of these modules may communicate, directly or indirectly, with one another (e.g., via one or more buses).

The narrowband manager 1210 may identify, based on a system bandwidth of a carrier, a set of narrowbands associated with communication using a first protocol. In some cases, the first protocol includes an eMTC protocol and the second protocol includes a NR protocol. In some examples, the narrowband manager 1210 may pass an indication 1275 of the system bandwidth or the set of narrowbands to the valid narrowband manager 1215. In some cases, the narrowband manager 1210 may pass a narrowband information 1270 to the resource grid alignment manager 1240 (e.g., and the resource grid alignment manager 1240 may align frequency resources associated with narrowbands indicated via narrowband information 1270).

The valid narrowband manager 1215 may receive an indication of a valid set of narrowbands for the communication using the first protocol. For example, the valid narrowband manager 1215 may receive a valid narrowband information 1230 (e.g., via a receiver 1010 or a receiver 1110, as described with reference to FIGS. 10 and 11, respectively) including the indication of the valid set of narrowbands for the communication using the first protocol. The valid narrowband information 1230 may be received via, for example, system information, RRC signaling, etc. In some examples, the valid narrowband manager 1215 may receive a bitmap (e.g., the valid narrowband information 1230 may include a bitmap) including one or more values indicating whether each narrowband of the set of narrowbands is within the valid set of narrowbands. In some cases, the bitmap includes values for each of the set of narrowbands of the carrier. In some cases, the bitmap includes values for one or more widebands of the carrier, where each wideband consists of a number of consecutive narrowbands. In some cases, the carrier is associated with a second protocol and the valid set of narrowbands is based on the carrier being associated with the second protocol.

The frequency hopping manager 1220 may identify a frequency hopping pattern for the communication using the first protocol. In some examples, the frequency hopping manager 1220 may perform frequency hopping for a set of time domain repetitions of a downlink transmission 1250 across the valid set of narrowbands according to the frequency hopping pattern, where the downlink transmission is received based on the frequency hopping. For example, frequency hopping manager 1220 may identify a frequency hopping pattern 1245 and may pass the frequency hopping pattern 1245 to reception manager 1225.

The reception manager 1225 may receive the downlink transmission 1250 based on frequency hopping for a plurality of time domain repetitions of the downlink transmission across the valid set of narrowbands according to the frequency hopping pattern. For example, in some cases the valid narrowband manager 1215 may pass a valid set of narrowbands 1255 to reception manager 1225. The reception manager 1135 may utilize information received via valid set of narrowbands 1255 and frequency hopping pattern 1245 to receive the downlink transmission 1250 (e.g., the reception manager 1135 may use the valid set of narrowbands and a frequency pattern defined according to a numerology assuming the valid set of narrowbands in order to receive the downlink transmission 1250 based on frequency hopping performed according to the valid set of narrowbands and the frequency pattern).

In some examples, the reception manager 1225 may receive a downlink transmission 1250 based on the identified set of narrowbands and a resource grid alignment parameter. For example, resource grid alignment manager 1240 may receive (e.g., via a receiver 1010 or a receiver 1110, as described with reference to FIGS. 10 and 11, respectively) a frequency alignment parameter 1260. In some examples, the resource grid alignment manager 1240 may align the set of narrowbands based on the system bandwidth and the frequency alignment parameter, where the downlink transmission is received based on the alignment. In some examples, the resource grid alignment manager 1240 may pass resource grid alignment information 1265 (e.g., a resource grid alignment parameter) to reception manager 1225 (e.g., and reception manager 1225 may receive a downlink transmission 1250 based on the aligned resource grid, for example, by preparing receiver circuitry to receive the downlink transmission 1250 according to realigned frequency resources).

In some examples, the reception manager 1225 may receive a control message for paging via a MPDCCH mapped to the valid set of narrowbands for the communication using the first protocol according to the frequency hopping. In some examples, the reception manager 1225 may receive, based on the control message, a paging message via a PDSCH mapped to the valid set of narrowbands according to the frequency hopping.

In some examples, the valid narrowband manager 1215 may receive an indication of a second valid set of narrowbands that are valid for the communication using the first protocol. In some cases, the valid narrowband manager 1215 may pass a second valid set of narrowbands 1280 to the transmission manager 1235. The transmission manager 1235 may transmit an uplink transmission 1285 based on the second valid set of narrowbands.

The valid narrowband manager 1215 may receive an indication of one or more subframes that are valid for a narrowband associated with the first protocol. In some examples, the reception manager 1225 may receive the downlink transmission based on the indication. The transmission manager 1235 may transmit an uplink transmission based on the second valid set of narrowbands.

The resource grid alignment manager 1240 may receive a first subcarrier offset for a first set of narrowbands. In some examples, the resource grid alignment manager 1240 may receive a second subcarrier offset for a second set of narrowbands, where the first set of narrowbands are associated with subcarriers having lower frequencies than a center subcarrier of the system bandwidth and the second set of narrowbands are associated with subcarriers having higher frequencies than the center subcarrier.

The resource grid alignment manager 1240 may receive a first resource block shift for aligning a start of a narrowband of the set of narrowbands with a RBG associated with a second protocol. In some examples, the resource grid alignment manager 1240 may receive a second resource block shift for aligning an end of the narrowband with the RBG associated with the second protocol. In some examples, the resource grid alignment manager 1240 may receive a DCI state indication, where the DCI state indication indicates a resource allocation based on the first resource block shift or the second resource block shift. In some examples, the resource grid alignment manager 1240 may receive a one bit shift indicator associated with one or more narrowbands of the plurality of narrowbands, where the one bit shift indicator indicates either the first resource block shift or the second resource block shift. In some cases, the first protocol includes an eMTC protocol and the second protocol includes a NR protocol, and where the resource grid alignment parameter is based on the RBG being associated with the second protocol.

Figure 13:
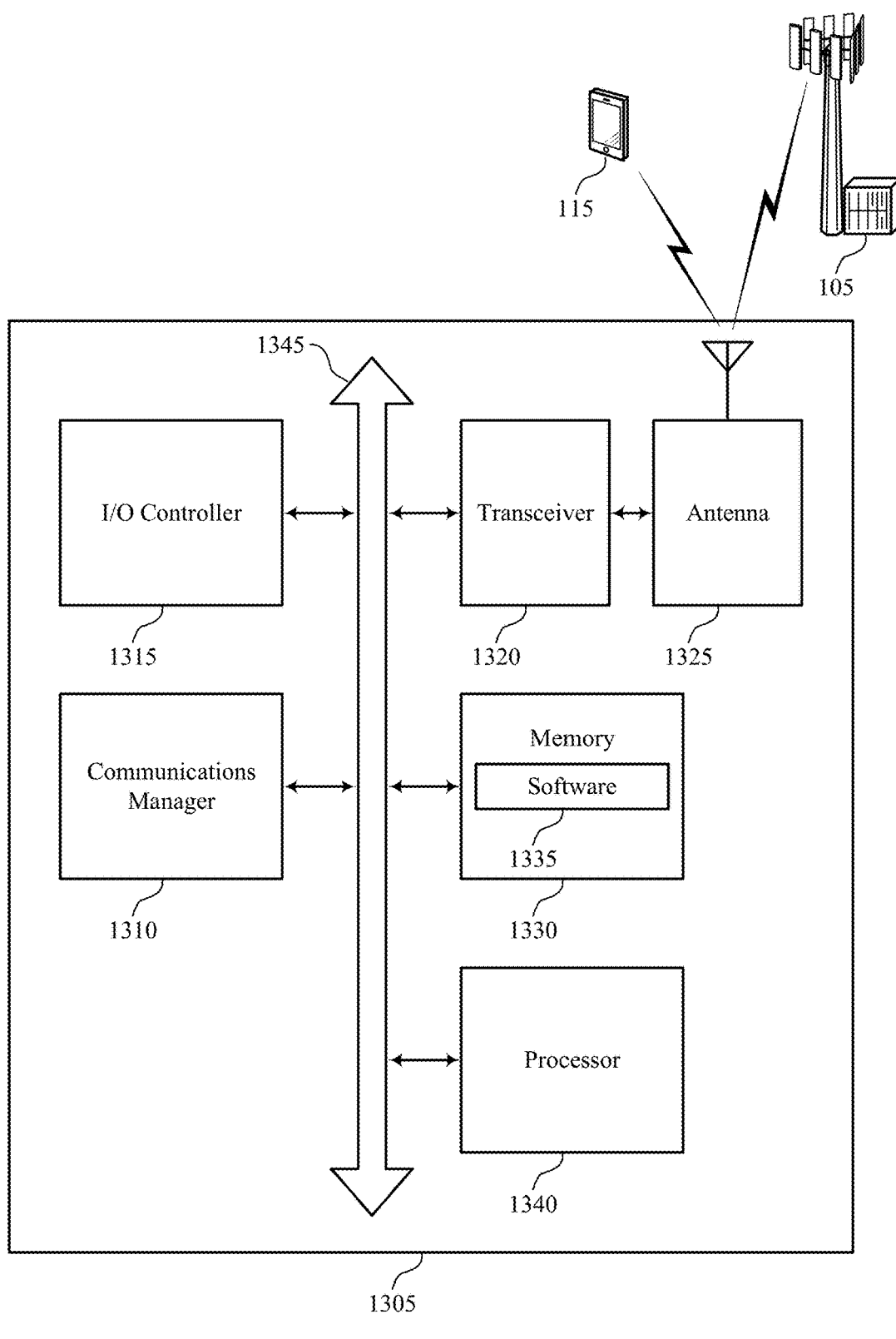
FIG. 13 shows a diagram of a system including a device that supports flexible resource allocation for narrowband and wideband coexistence in accordance with aspects of the present disclosure.

FIG. 13 shows a diagram of a system 1300 including a device 1305 that supports flexible resource allocation for narrowband and wideband coexistence in accordance with aspects of the present disclosure. The device 1305 may be an example of or include the components of device 1005, device 1105, or a UE 115 as described herein. The device 1305 may include components for bi-directional voice and data communications including components for transmitting and receiving communications, including a communications manager 1310, an I/O controller 1315, a transceiver 1320, an antenna 1325, memory 1330, and a processor 1340. These components may be in electronic communication via one or more buses (e.g., bus 1345).

The communications manager 1310 may identify, based on a system bandwidth of a carrier, a set of narrowbands associated with communication using a first protocol, receive an indication of a valid set of narrowbands for the communication using the first protocol, identify a frequency hopping pattern for the communication using the first protocol, and receive a downlink transmission based on frequency hopping for a plurality of time domain repetitions of the downlink transmission across the valid set of narrowbands according to the frequency hopping pattern (e.g., based on the valid set of narrowbands and the frequency hopping pattern). The communications manager 1310 may also identify, based on a system bandwidth of a carrier, a set of narrowbands associated with a first protocol, receive a frequency alignment parameter for communication using the first protocol, align the plurality of narrowbands based at least in part on the system bandwidth and the frequency alignment parameter, and receive a downlink transmission based on the aligned set of narrowbands.

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM and ROM. The memory 1330 may store computer-readable, computer-executable code or software 1335 including instructions that, when executed, cause the processor to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting flexible resource allocation for narrowband and wideband coexistence).

The software 1335 may include instructions to implement aspects of the present disclosure, including instructions to support wireless communications. The software 1335 may be stored in a non-transitory computer-readable medium such as system memory or other type of memory. In some cases, the software 1335 may not be directly executable by the processor 1340 but may cause a computer (e.g., when compiled and executed) to perform functions described herein.

Figure 14:
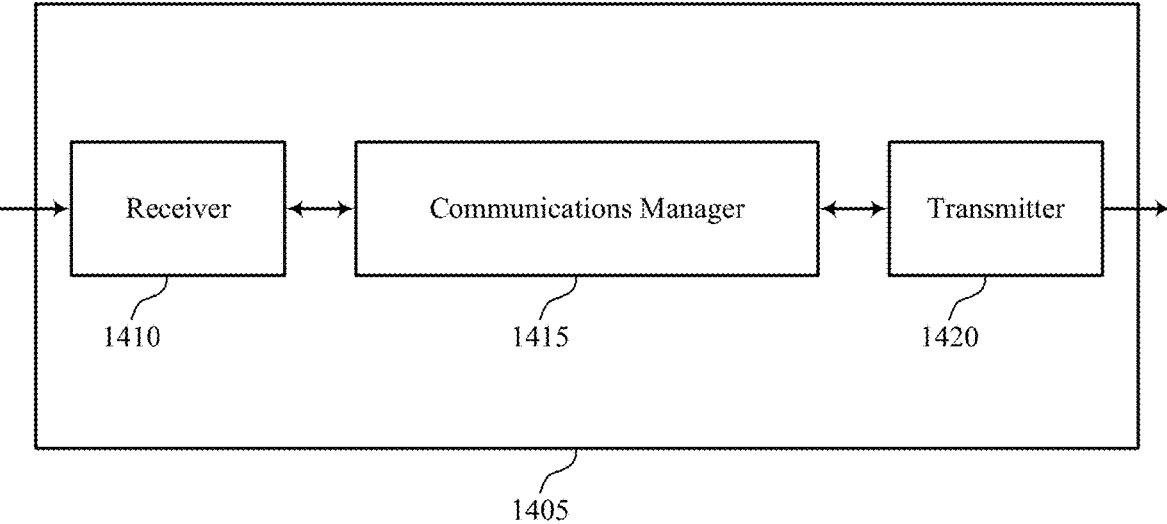
FIGS. 14 and 15 show block diagrams of devices that support flexible resource allocation for narrowband and wideband coexistence in accordance with aspects of the present disclosure.

FIG. 14 shows a block diagram 1400 of a device 1405 that supports flexible resource allocation for narrowband and wideband coexistence in accordance with aspects of the present disclosure. The device 1405 may be an example of aspects of a base station 105 as described herein. The device 1405 may include a receiver 1410, a communications manager 1415, and a transmitter 1420. The device 1405 may also include a processor. Each of these components may be in communication with one another (e.g., via one or more buses).

The receiver 1410 may receive information such as packets, user data, or control information associated with various information channels (e.g., control channels, data channels, and information related to flexible resource allocation for narrowband and wideband coexistence, etc.). Information may be passed on to other components of the device 1405. The receiver 1410 may be an example of aspects of the transceiver 1720 described with reference to FIG. 17. The receiver 1410 may utilize a single antenna or a set of antennas.

The communications manager 1415 may identify, based on a system bandwidth of a carrier, a set of narrowbands associated with a first protocol, transmit, to a first UE, an indication of a valid set of narrowbands for the communication using the first protocol, transmit, to the first UE, a first frequency hopping pattern for the communication using the first protocol, and transmit, to the first UE, a first downlink transmission based on the valid set of narrowbands and the first frequency hopping pattern. The communications manager 1415 may also identify, based on a system bandwidth of a carrier, a set of narrowbands associated with communication using a first protocol, transmit a resource grid alignment parameter for the communication using the first protocol, where the resource grid alignment parameter indicates a frequency resource alignment, and transmit a downlink transmission based on the identified set of narrowbands and the resource grid alignment parameter. The communications manager 1415 may be an example of aspects of the communications manager 1710 described herein.

The communications manager 1415, or its sub-components, may be implemented in hardware, code (e.g., software or firmware) executed by a processor, or any combination thereof. If implemented in code executed by a processor, the functions of the communications manager 1415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1415, or its sub-components, may be physically located at various positions, including being distributed such that portions of functions are implemented at different physical locations by one or more physical components. In some examples, the communications manager 1415, or its sub-components, may be a separate and distinct component in accordance with various aspects of the present disclosure. In some examples, the communications manager 1415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1720 described with reference to FIG. 17. The transmitter 1420 may utilize a single antenna or a set of antennas.

Figure 15:
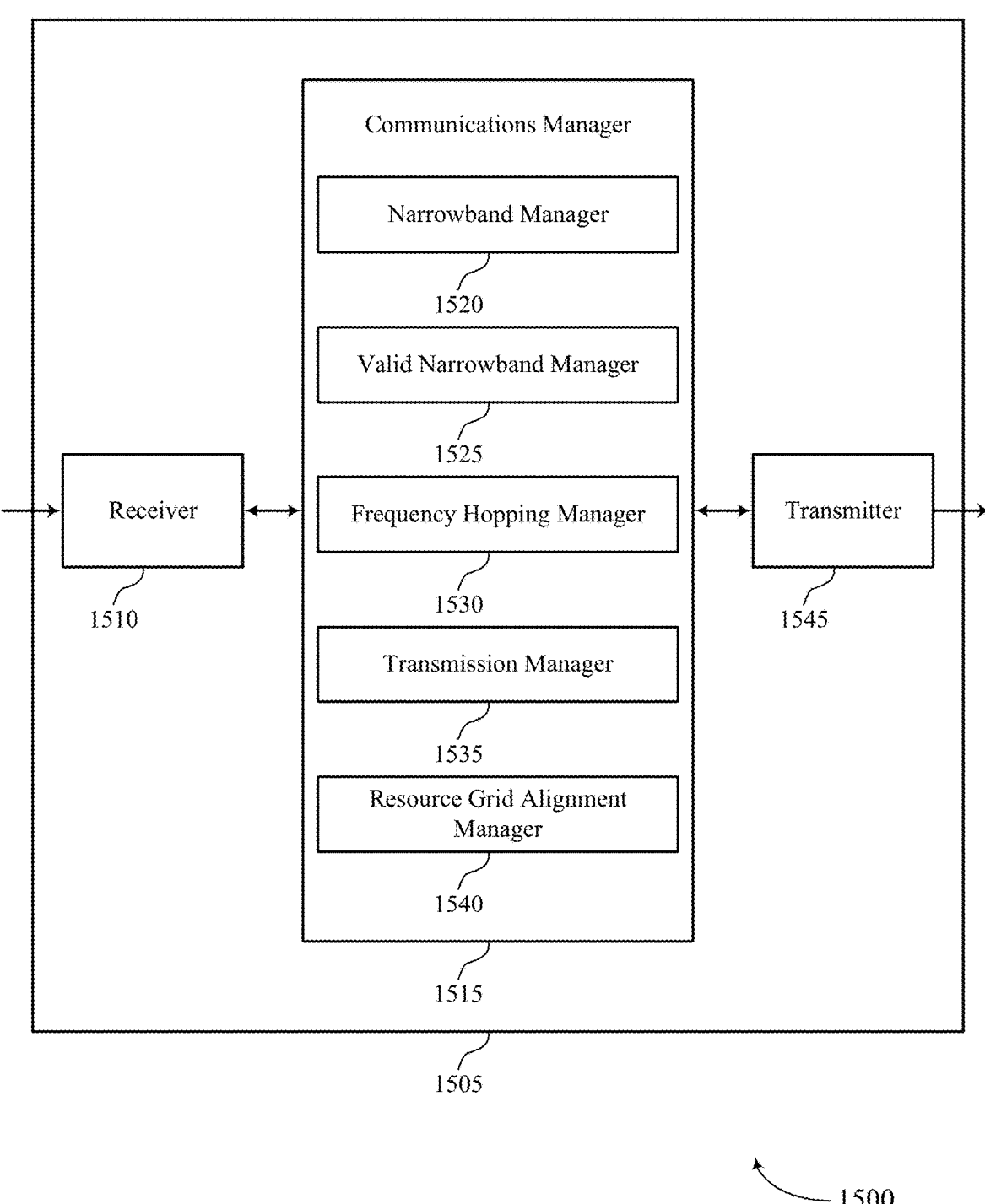

FIG. 15 shows a block diagram 1500 of a device 1505 that supports flexible resource allocation for narrowband and wideband coexistence in accordance with aspects of the present disclosure. The device 1505 may be an example of aspects of a device 1405 or a base station 105 as described herein. The device 1505 may include a receiver 1510, a communications manager 1515, and a transmitter 1545. The device 1505 may also include a processor. Each of these components may be in communication with one another (e.g., via one or more buses).

The receiver 1510 may receive information such as packets, user data, or control information associated with various information channels (e.g., control channels, data channels, and information related to flexible resource allocation for narrowband and wideband coexistence, etc.). Information may be passed on to other components of the device 1505. The receiver 1510 may be an example of aspects of the transceiver 1720 described with reference to FIG. 17. The receiver 1510 may utilize a single antenna or a set of antennas.

The communications manager 1515 may be an example of aspects of the communications manager 1415 as described herein. The communications manager 1515 may include a narrowband manager 1520, a valid narrowband manager 1525, a frequency hopping manager 1530, a transmission manager 1535, and a resource grid alignment manager 1540. The communications manager 1515 may be an example of aspects of the communications manager 1710 described herein.

The narrowband manager 1520 may identify, based on a system bandwidth of a carrier, a set of narrowbands associated with a first protocol. The valid narrowband manager 1525 may transmit, to a first UE, an indication of a valid set of narrowbands for the communication using the first protocol. The frequency hopping manager 1530 may transmit, to the first UE, a first frequency hopping pattern for the communication using the first protocol. The transmission manager 1535 may transmit, to the first UE, a first downlink transmission based on the valid set of narrowbands and the first frequency hopping pattern.

The narrowband manager 1520 may identify, based on a system bandwidth of a carrier, a set of narrowbands associated with communication using a first protocol. The resource grid alignment manager 1540 may transmit a frequency alignment parameter for the communication using the first protocol. The transmission manager 1535 may transmit a downlink transmission based on the identified set of narrowbands and the frequency alignment parameter.

The transmitter 1545 may transmit signals generated by other components of the device 1505. In some examples, the transmitter 1545 may be collocated with a receiver 1510 in a transceiver module. For example, the transmitter 1545 may be an example of aspects of the transceiver 1720 described with reference to FIG. 17. The transmitter 1545 may utilize a single antenna or a set of antennas.

Figure 16:
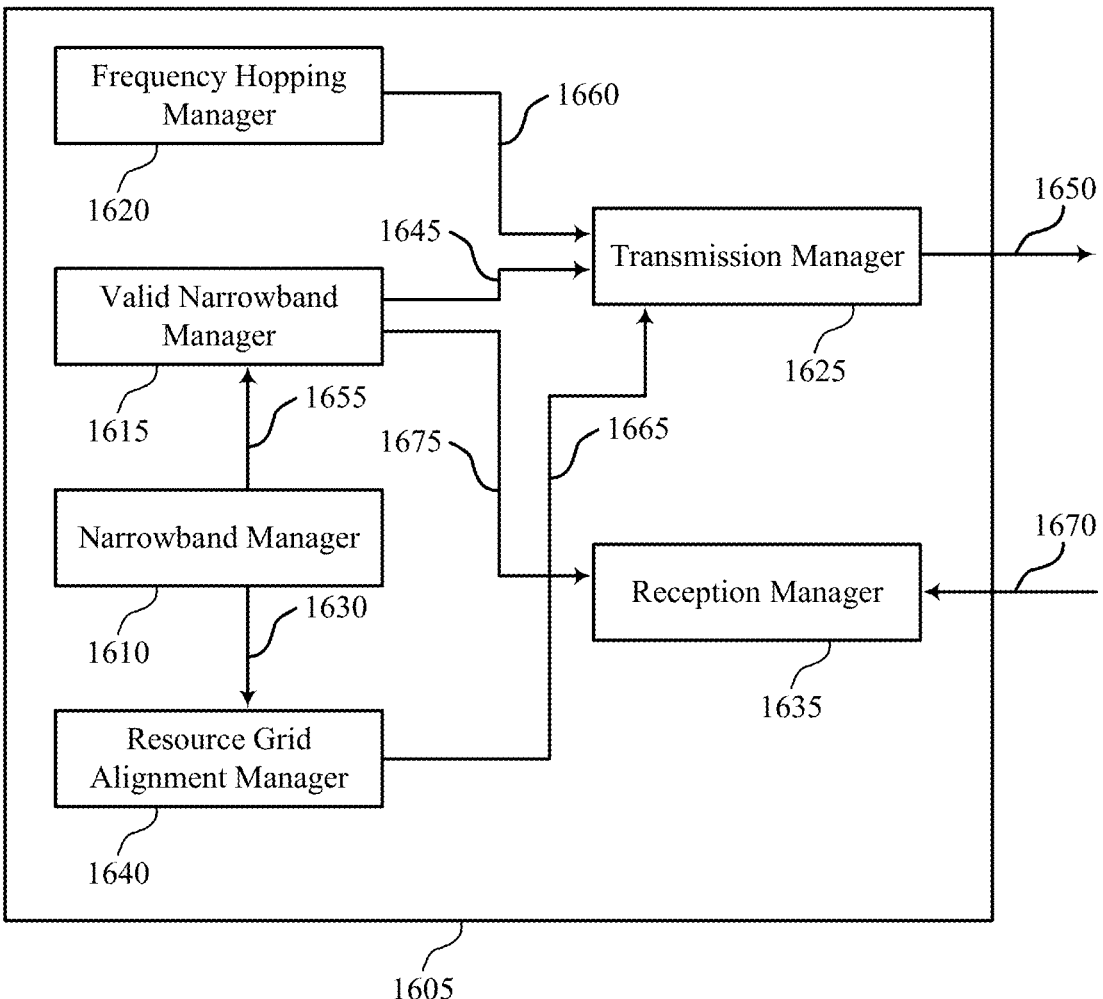
FIG. 16 shows a block diagram of a communications manager that supports flexible resource allocation for narrowband and wideband coexistence in accordance with aspects of the present disclosure.

FIG. 16 shows a block diagram 1600 of a communications manager 1605 that supports flexible resource allocation for narrowband and wideband coexistence in accordance with aspects of the present disclosure. The communications manager 1605 may be an example of aspects of a communications manager 1415, a communications manager 1515, or a communications manager 1710 described herein. The communications manager 1605 may include a narrowband manager 1610, a valid narrowband manager 1615, a frequency hopping manager 1620, a transmission manager 1625, a reception manager 1635, and a resource grid alignment manager 1640. Each of these modules may communicate, directly or indirectly, with one another (e.g., via one or more buses).

The narrowband manager 1610 may identify, based on a system bandwidth of a carrier, a set of narrowbands associated with a first protocol. In some cases, the carrier is associated with a second protocol and the valid set of narrowbands for the communication using the first protocol is based on the carrier being associated with the second protocol. In some cases, the first protocol includes an eMTC protocol and the second protocol includes a NR protocol. In some cases, the narrowband manager 1610 may pass narrowband information 1630 to the resource grid alignment manager 1640 (e.g., and the resource grid alignment manager 1640 may align frequency resources associated with the narrowband information 1630).

The valid narrowband manager 1615 may transmit, to a first UE, an indication of a valid set of narrowbands for the communication using the first protocol. For example, the valid narrowband manager 1615 may pass a valid narrowband information 1645 to a transmission manager 1625, and the transmission manager may pass an indication 1650 to, for example, a transmitter 1420 or a transmitter 1545, as described with reference to FIGS. 14 and 15, respectively, where the indication 1650 may indicate the valid set of narrowbands for the communication using the first protocol. In some examples, the narrowband manager 1610 may pass a narrowband information 1655 to the valid narrowband manager 1615 (e.g., and the valid narrowband manager 1615 may prepare the indication of the valid set of narrowbands based on the information (e.g., numerology) of the set of narrowbands indicated via narrowband information 1655). In some examples, the valid narrowband manager 1615 may transmit a bitmap including one or more values indicating whether each narrowband of the set of narrowbands is within the valid set of narrowbands for the communication using the first protocol. In some examples, the valid narrowband manager 1615 may transmit an indication of a second valid set of narrowbands that are valid for the communication using the first protocol. In some cases, the bitmap includes values for each of the set of narrowbands of the carrier. In some cases, the bitmap includes values for one or more widebands of the carrier, where each wideband consists of a number of consecutive narrowbands.

The frequency hopping manager 1620 may transmit, to the first UE, a first frequency hopping pattern for the communication using the first protocol. In some examples, the frequency hopping manager 1620 may transmit, to a second UE, a second frequency hopping pattern for the communication using the first protocol. For example, the frequency hopping manager 1620 may pass frequency hopping information 1660 to a transmission manager 1625, and the transmission manager may pass an indication 1650 to, for example, a transmitter 1420 or a transmitter 1545, as described with reference to FIGS. 14 and 15, respectively, where the indication 1650 may indicate the first frequency hopping pattern, the second frequency hopping pattern, or both (e.g., and the transmitter 1420 or the transmitter 1545 may transmit the first frequency hopping pattern and the second frequency hopping to the first UE and the second UE, respectively).

The transmission manager 1625 may transmit, to the first UE, a first downlink transmission based on the valid set of narrowbands and the first frequency hopping pattern. In some examples, the transmission manager 1625 may transmit a downlink transmission based on the identified set of narrowbands and the frequency alignment parameter. In some examples, the transmission manager 1625 may transmit, to the first UE, a set of repetitions of a control message for paging via a MPDCCH mapped to the valid set of narrowbands for the communication using the first protocol according to the first frequency hopping pattern. In some examples, the transmission manager 1625 may transmit, to the first UE, a set of repetitions of a paging message via PDSCH mapped to the valid set of narrowbands according to the first frequency hopping pattern and the control message for paging. In some examples, the transmission manager 1625 may transmit, to the second UE, a second downlink transmission based on the set of narrowbands associated with the first protocol and the second frequency hopping pattern.

The resource grid alignment manager 1640 may transmit a frequency alignment parameter for the communication using the first protocol. For example, the resource grid alignment manager 1640 may pass frequency alignment information 1665 to a transmission manager 1625, and the transmission manager may pass an indication 1650 to, for example, a transmitter 1420 or a transmitter 1545, as described with reference to FIGS. 14 and 15, respectively, where the indication 1650 may include the frequency alignment parameter (e.g., based on the frequency alignment information 1665).

The valid narrowband manager 1615 may transmit an indication of one or more subframes that are valid for a narrowband associated with the first protocol. In some examples, the transmission manager 1625 may transmit the first downlink transmission based on the indication. In some cases, the valid narrowband manager 1615 may pass a valid narrowband set 1675 to the reception manager 1635. The reception manager 1635 may receive an uplink transmission 1670 based on the second set of the plurality of narrowbands.

The resource grid alignment manager 1640 may identify a subcarrier offset between a resource block grid associated with the first protocol and a resource block grid associated with a second protocol, where the frequency alignment parameter is based on the identified subcarrier offset. In some examples, the resource grid alignment manager 1640 may transmit a for a plurality of time domain repetitions of the downlink transmission across the valid set of narrowbands according to the frequency hopping pattern for a first set of narrowbands. In some examples, the resource grid alignment manager 1640 may transmit a second subcarrier offset for a second set of narrowbands, where the first set of narrowbands are associated with subcarriers having lower frequencies than a center subcarrier of the system bandwidth and the second set of narrowbands are associated with subcarriers having higher frequencies than the center subcarrier.

The resource grid alignment manager 1640 may transmit a first resource block shift for aligning a start of a narrowband of the set of narrowbands with a RBG associated with a second protocol. In some examples, the resource grid alignment manager 1640 may transmit a second resource block shift for aligning an end of the narrowband with the RBG associated with the second protocol. In some examples, the resource grid alignment manager 1640 may transmit a DCI state indication, where the DCI state indication indicates a resource allocation based on the first resource block shift or the second resource block shift. In some examples, the resource grid alignment manager 1640 may transmit a one bit shift indicator associated with one or more narrowbands of the plurality of narrowbands, where the one bit shift indicator indicates either the first resource block shift or the second resource block shift. In some cases, the first protocol includes an eMTC protocol and the second protocol includes a NR protocol, and where the frequency alignment parameter is based on the RBG being associated with the second protocol.

Figure 17:
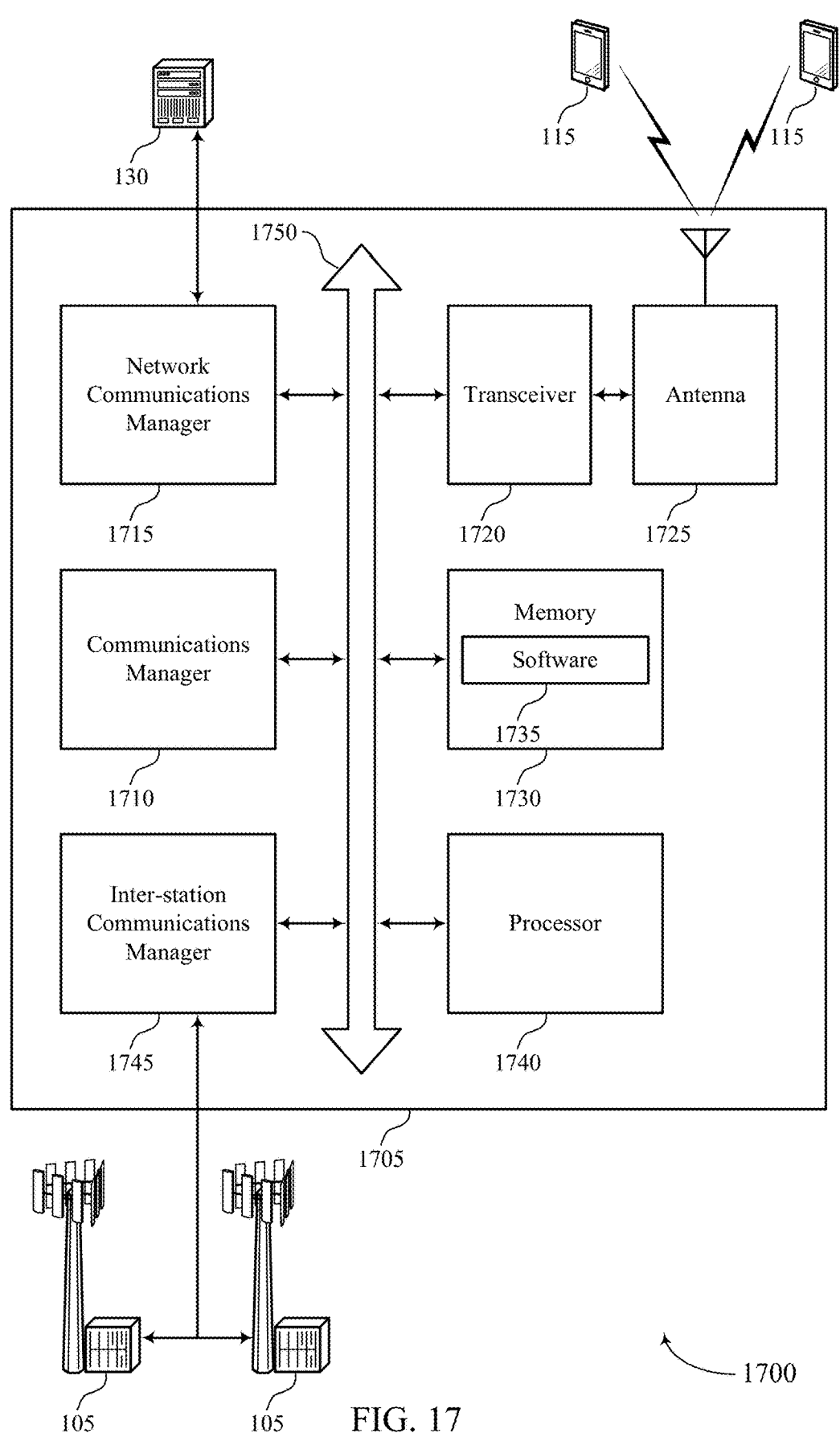
FIG. 17 shows a diagram of a system including a device that supports flexible resource allocation for narrowband and wideband coexistence in accordance with aspects of the present disclosure.

FIG. 17 shows a diagram of a system 1700 including a device 1705 that supports flexible resource allocation for narrowband and wideband coexistence in accordance with aspects of the present disclosure. The device 1705 may be an example of or include the components of device 1405, device 1505, or a base station 105 as described herein. The device 1705 may include components for bi-directional voice and data communications including components for transmitting and receiving communications, including a communications manager 1710, a network communications manager 1715, a transceiver 1720, an antenna 1725, memory 1730, a processor 1740, and an inter-station communications manager 1745. These components may be in electronic communication via one or more buses (e.g., bus 1750).

The communications manager 1710 may identify, based on a system bandwidth of a carrier, a set of narrowbands associated with a first protocol, transmit, to a first UE, an indication of a valid set of narrowbands for the communication using the first protocol, transmit, to the first UE, a first frequency hopping pattern for the communication using the first protocol, and transmit, to the first UE, a first downlink transmission based on the valid set of narrowbands and the first frequency hopping pattern. The communications manager 1710 may also identify, based on a system bandwidth of a carrier, a set of narrowbands associated with communication using a first protocol, transmit a frequency alignment parameter for the communication using the first protocol, and transmit a downlink transmission based on the identified set of narrowbands and the frequency alignment parameter.

The network communications manager 1715 may manage communications with the core network (e.g., via one or more wired backhaul links). For example, the network communications manager 1715 may manage the transfer of data communications for client devices, such as one or more UEs 115.

The transceiver 1720 may communicate bi-directionally, via one or more antennas, wired, or wireless links as described above. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas.

In some cases, the wireless device may include a single antenna 1725. However, in some cases the device may have more than one antenna 1725, which may be capable of concurrently transmitting or receiving multiple wireless transmissions.

The memory 1730 may include RAM, ROM, or a combination thereof. The memory 1730 may store computer-readable code or software 1735 including instructions that, when executed by a processor (e.g., the processor 1740) cause the device to perform various functions described herein. In some cases, the memory 1730 may contain, among other things, a BIOS which may control basic hardware or software operation such as the interaction with peripheral components or devices.

The processor 1740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some cases, a memory controller may be integrated into processor 1740. The processor 1740 may be configured to execute computer-readable instructions stored in a memory (e.g., the memory 1730) to cause the device #{device} to perform various functions (e.g., functions or tasks supporting flexible resource allocation for narrowband and wideband coexistence).

The inter-station communications manager 1745 may manage communications with other base station 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communication network technology to provide communication between base stations 105.

The software 1735 may include instructions to implement aspects of the present disclosure, including instructions to support wireless communications. The software 1735 may be stored in a non-transitory computer-readable medium such as system memory or other type of memory. In some cases, the software 1735 may not be directly executable by the processor 1740 but may cause a computer (e.g., when compiled and executed) to perform functions described herein.

Figure 18:
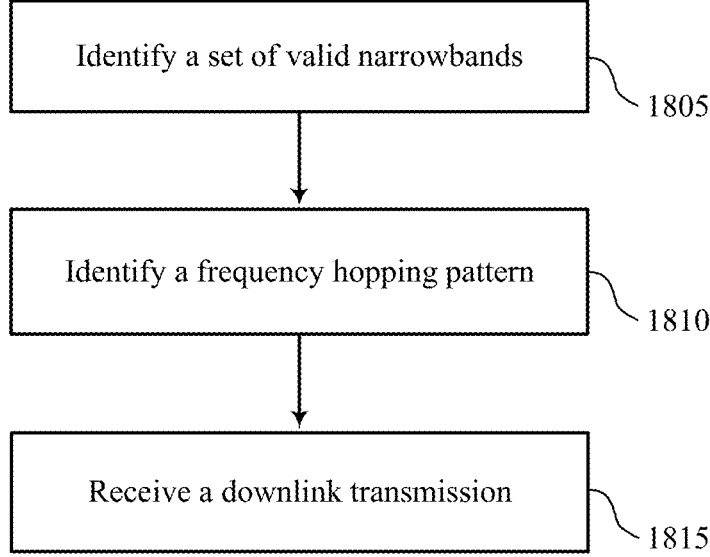
FIGS. 18 through 26 show flowcharts illustrating methods that support flexible resource allocation for narrowband and wideband coexistence in accordance with aspects of the present disclosure.

FIG. 18 shows a flowchart illustrating a method 1800 that supports flexible resource allocation for narrowband and wideband coexistence in accordance with aspects of the present disclosure. The operations of method 1800 may be implemented by a UE 115 or its components as described herein. For example, the operations of method 1800 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1805, the UE may identify a set of valid narrowbands. For example, in some cases, the UE may identify, based on a system bandwidth of a carrier, a set of narrowbands associated with communication using a first protocol, and the UE may receive an indication of a valid set of narrowbands for the communication using the first protocol. In some cases, the UE may identify time resources, frequency resources, or both associated with the valid set of narrowbands based on the first protocol. The operations of 1805 may be performed according to the methods described herein. In some examples, aspects of the operations of 1805 may be performed by a narrowband manager and/or by a valid narrowband manager as described with reference to FIGS. 10 through 13.

At 1810, the UE may identify a frequency hopping pattern (e.g., for the communication using the first protocol). For example, in some cases, the UE may identify a frequency hopping pattern based on a numerology associated with the valid set of narrowbands. The operations of 1815 may be performed according to the methods described herein. In some examples, aspects of the operations of 1815 may be performed by a frequency hopping manager as described with reference to FIGS. 10 through 13.

At 1815, the UE may receive the downlink transmission (e.g., based on the valid set of narrowbands and the frequency hopping pattern). For example, the UE may perform frequency hopping for a plurality of time domain repetitions of a downlink transmission across the valid set of narrowbands according to the frequency hopping pattern, and the UE may receive the downlink transmission based on the frequency hopping. For example, the UE may identify time-frequency resources (e.g., based on the frequency hopping pattern, the valid set of narrowbands, etc.) over which the downlink transmission may be transmitted, demodulate the transmission over the time-frequency resources, and decode the demodulated transmission to obtain bits that indicate the information of the downlink transmission. The operations of 1815 may be performed according to the methods described herein. In some examples, aspects of the operations of 1815 may be performed by a reception manager and/or by a frequency hopping manager as described with reference to FIGS. 10 through 13.

Figure 19:
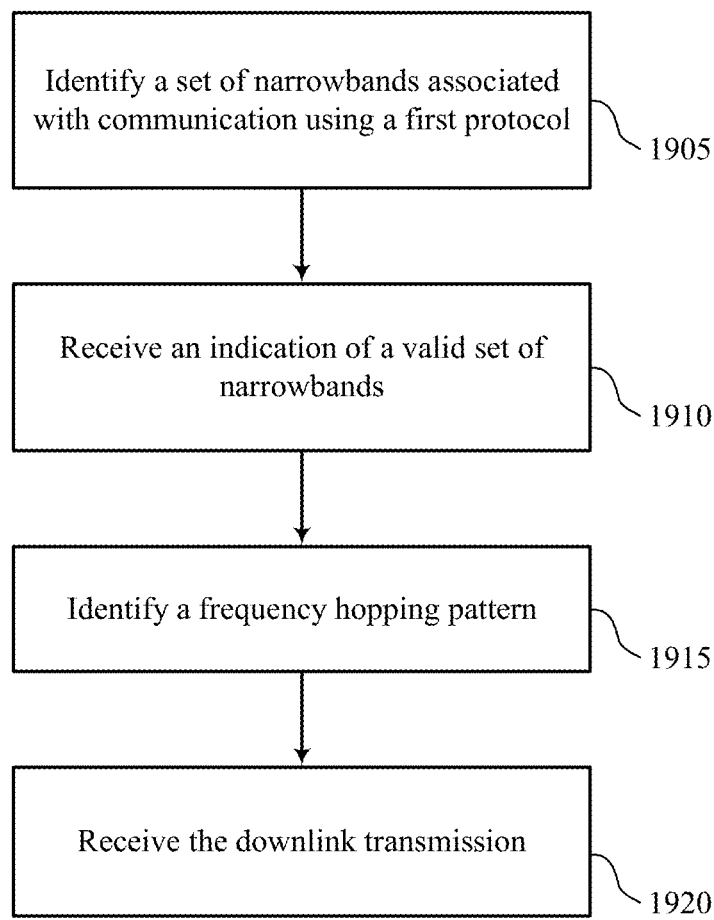

FIG. 19 shows a flowchart illustrating a method 1900 that supports flexible resource allocation for narrowband and wideband coexistence in accordance with aspects of the present disclosure. The operations of method 1900 may be implemented by a UE 115 or its components as described herein. For example, the operations of method 1900 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1905, the UE may identify, based on a system bandwidth of a carrier, a set of narrowbands associated with communication using a first protocol. The operations of 1905 may be performed according to the methods described herein. In some examples, aspects of the operations of 1905 may be performed by a narrowband manager as described with reference to FIGS. 10 through 13.

At 1910, the UE may receive an indication of a valid set of narrowbands for the communication using the first protocol. The operations of 1910 may be performed according to the methods described herein. In some examples, aspects of the operations of 1910 may be performed by a valid narrowband manager as described with reference to FIGS. 10 through 13.

At 1915, the UE may identify a frequency hopping pattern for the communication using the first protocol. The operations of 1915 may be performed according to the methods described herein. In some examples, aspects of the operations of 1915 may be performed by a frequency hopping manager as described with reference to FIGS. 10 through 13.

At 1920, the UE may receive the downlink transmission based on frequency hopping for a plurality of time domain repetitions of the downlink transmission across the valid set of narrowbands according to the frequency hopping pattern. The operations of 1920 may be performed according to the methods described herein. In some examples, aspects of the operations of 1920 may be performed by a reception manager as described with reference to FIGS. 10 through 13.

Figure 20:
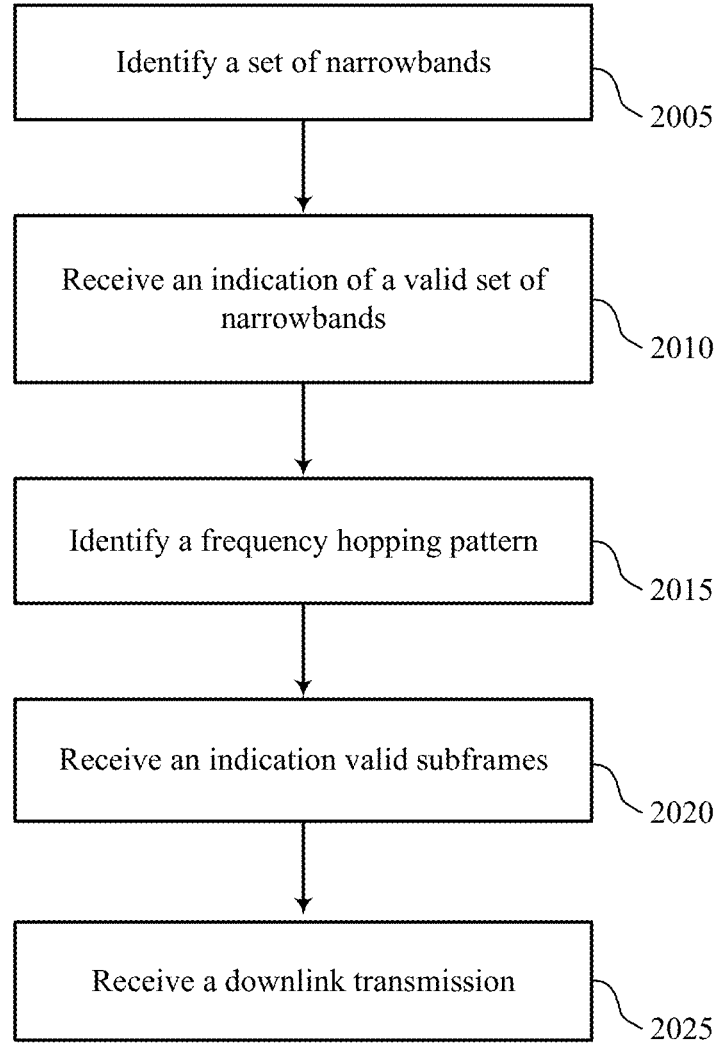

FIG. 20 shows a flowchart illustrating a method 2000 that supports flexible resource allocation for narrowband and wideband coexistence in accordance with aspects of the present disclosure. The operations of method 2000 may be implemented by a UE 115 or its components as described herein. For example, the operations of method 2000 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 2005, the UE may identify, based on a system bandwidth of a carrier, a set of narrowbands associated with communication using a first protocol. The operations of 2005 may be performed according to the methods described herein. In some examples, aspects of the operations of 2005 may be performed by a narrowband manager as described with reference to FIGS. 10 through 13.

At 2010, the UE may receive an indication of a valid set of narrowbands for the communication using the first protocol. The operations of 2010 may be performed according to the methods described herein. In some examples, aspects of the operations of 2010 may be performed by a valid narrowband manager as described with reference to FIGS. 10 through 13.

At 2015, the UE may identify a frequency hopping pattern for the communication using the first protocol. The operations of 2015 may be performed according to the methods described herein. In some examples, aspects of the operations of 2015 may be performed by a frequency hopping manager as described with reference to FIGS. 10 through 13.

At 2020, the UE may receive an indication of one or more subframes that are valid for a narrowband associated with the first protocol. The operations of 2020 may be performed according to the methods described herein. In some examples, aspects of the operations of 2020 may be performed by a valid subframe manager as described with reference to FIGS. 10 through 13.

At 2025, the UE may receive a downlink transmission based on the indication of valid subframes, the valid set of narrowbands, and the frequency hopping pattern. The operations of 2025 may be performed according to the methods described herein. In some examples, aspects of the operations of 2025 may be performed by a reception manager as described with reference to FIGS. 10 through 13.

Figure 21:
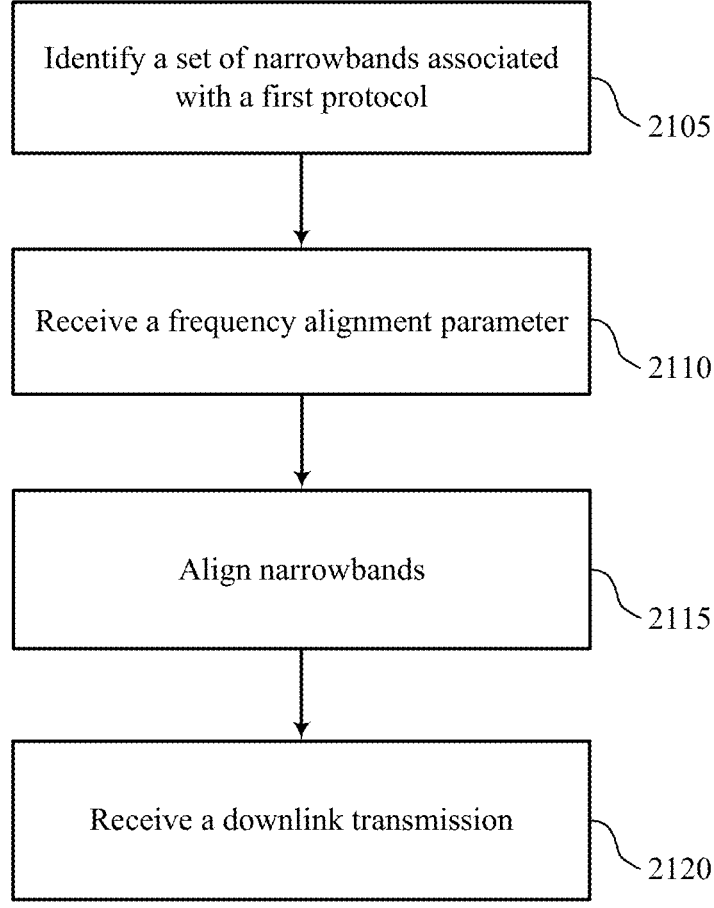

FIG. 21 shows a flowchart illustrating a method 2100 that supports flexible resource allocation for narrowband and wideband coexistence in accordance with aspects of the present disclosure. The operations of method 2100 may be implemented by a UE 115 or its components as described herein. For example, the operations of method 2100 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 2105, the UE may identify, based on a system bandwidth of a carrier, a set of narrowbands associated with a first protocol. The operations of 2105 may be performed according to the methods described herein. In some examples, aspects of the operations of 2105 may be performed by a narrowband manager as described with reference to FIGS. 10 through 13.

At 2110, the UE may receive a frequency alignment parameter for communication using the first protocol, an. For example, the UE may identify time-frequency resources over which the frequency alignment parameter may be transmitted (e.g., time-frequency resources associated with system information, RRC signaling, etc.), demodulate the transmission over the time-frequency resources, and decode the demodulated transmission to obtain bits that indicate the frequency alignment parameter. The operations of 2110 may be performed according to the methods described herein. In some examples, aspects of the operations of 2110 may be performed by a resource grid alignment manager as described with reference to FIGS. 10 through 13.

At 2115, the UE may align the plurality of narrowbands based at least in part on the system bandwidth and the frequency alignment parameter. For example, the UE may align time-frequency resources over which a downlink transmission may be transmitted. The operations of 2115 may be performed according to the methods described herein. In some examples, aspects of the operations of 2115 may be performed by a resource grid alignment manager as described with reference to FIGS. 10 through 13.

At 2120, the UE may receive a downlink transmission based on the aligned set of narrowbands. For example, the UE may identify time-frequency resources (e.g., based on the frequency alignment parameter, etc.) over which the downlink transmission may be transmitted, demodulate the transmission over the time-frequency resources, and decode the demodulated transmission to obtain bits that indicate the information of the downlink transmission. The operations of 2120 may be performed according to the methods described herein. In some examples, aspects of the operations of 2120 may be performed by a reception manager as described with reference to FIGS. 10 through 13.

Figure 22:
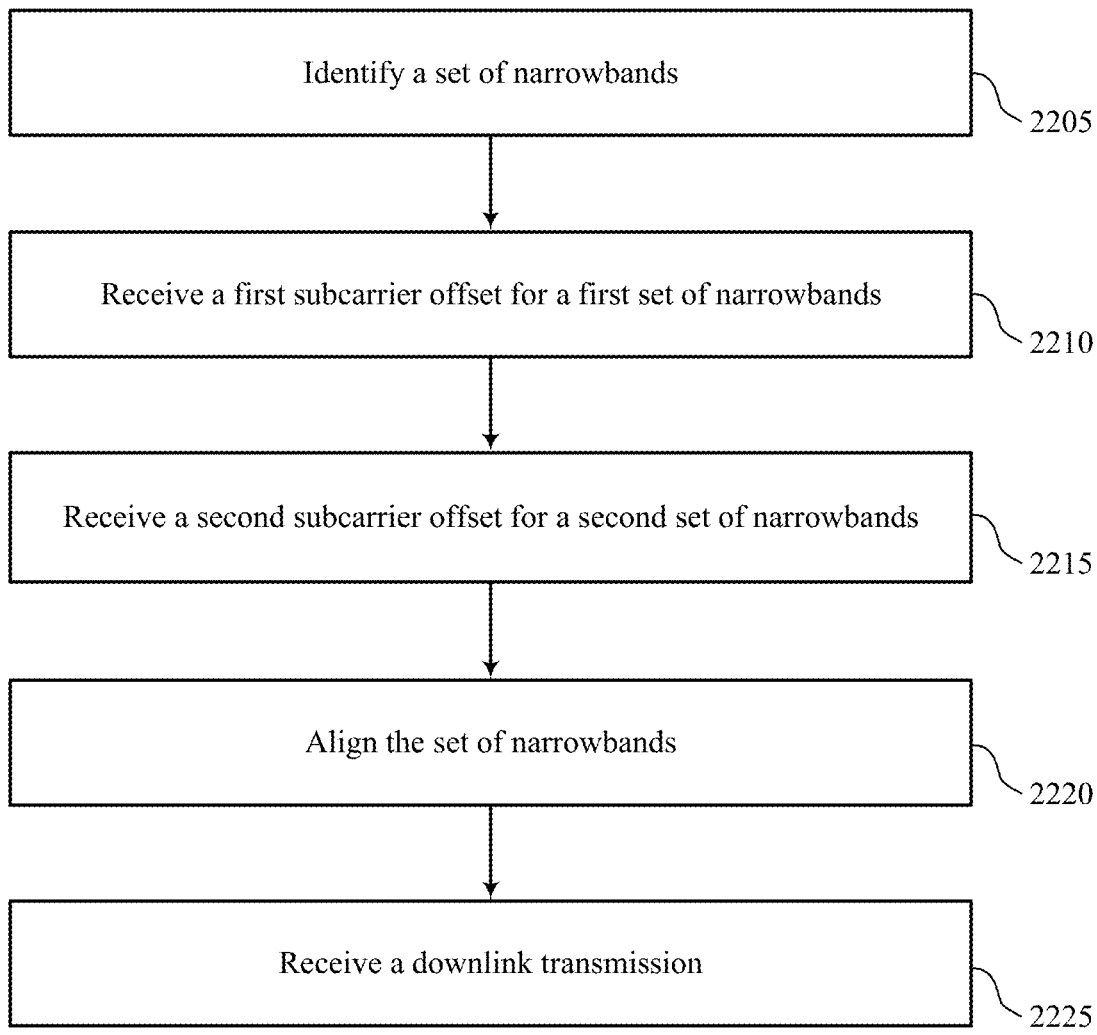

FIG. 22 shows a flowchart illustrating a method 2200 that supports flexible resource allocation for narrowband and wideband coexistence in accordance with aspects of the present disclosure. The operations of method 2200 may be implemented by a UE 115 or its components as described herein. For example, the operations of method 2200 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 2205, the UE may identify, based on a system bandwidth of a carrier, a set of narrowbands associated with a first protocol. The operations of 2205 may be performed according to the methods described herein. In some examples, aspects of the operations of 2205 may be performed by a narrowband manager as described with reference to FIGS. 10 through 13.

At 2210, the UE may receive a first subcarrier offset for a first set of narrowbands (e.g., for communication using the first protocol). The operations of 2210 may be performed according to the methods described herein. In some examples, aspects of the operations of 2210 may be performed by a subcarrier offset manager as described with reference to FIGS. 10 through 13.

At 2215, the UE may receive a second subcarrier offset for a second set of narrowbands, where the first set of narrowbands are associated with subcarriers having lower frequencies than a center subcarrier of the system bandwidth and the second set of narrowbands are associated with subcarriers having higher frequencies than the center subcarrier. The operations of 2215 may be performed according to the methods described herein. In some examples, aspects of the operations of 2215 may be performed by a subcarrier offset manager as described with reference to FIGS. 10 through 13.

At 2220, the UE may align the set of narrowbands based on the system bandwidth, the first subcarrier offset, and/or the second carrier offset), where the downlink transmission is received based on the alignment. The operations of 2220 may be performed according to the methods described herein. In some examples, aspects of the operations of 2220 may be performed by a resource grid alignment manager as described with reference to FIGS. 10 through 13.

At 2225, the UE may receive a downlink transmission based on alignment (e.g., based on the identified set of narrowbands, the first subcarrier offset, and/or the second carrier offset). The operations of 2225 may be performed according to the methods described herein. In some examples, aspects of the operations of 2225 may be performed by a reception manager as described with reference to FIGS. 10 through 13.

Figure 23:
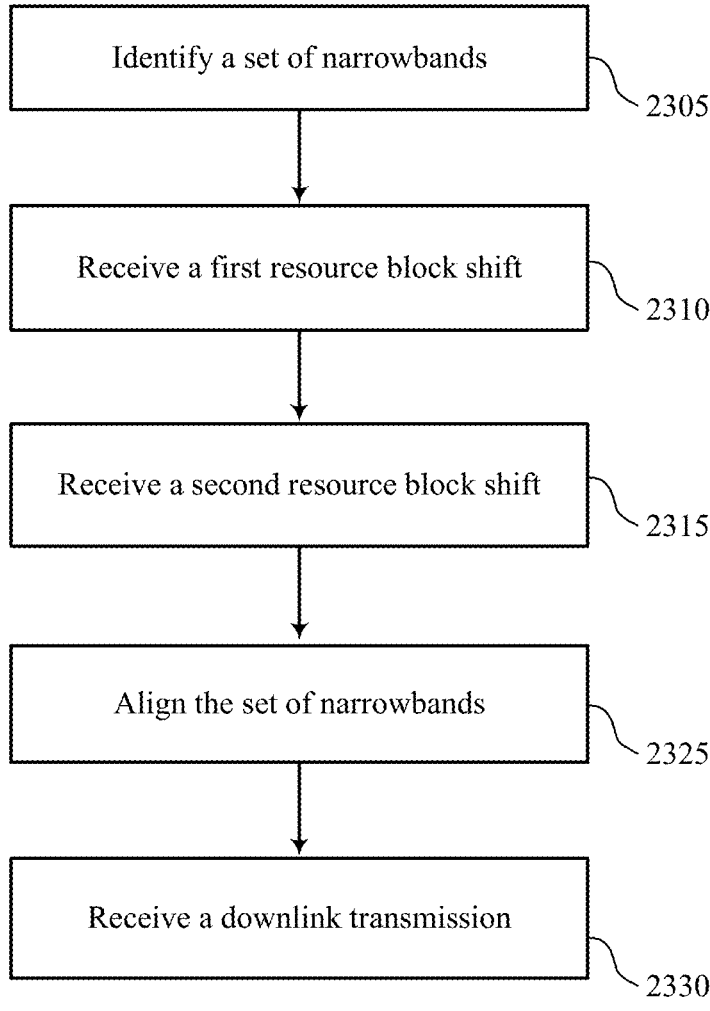

FIG. 23 shows a flowchart illustrating a method 2300 that supports flexible resource allocation for narrowband and wideband coexistence in accordance with aspects of the present disclosure. The operations of method 2300 may be implemented by a UE 115 or its components as described herein. For example, the operations of method 2300 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 2305, the UE may identify, based on a system bandwidth of a carrier, a set of narrowbands associated with a first protocol. The operations of 2305 may be performed according to the methods described herein. In some examples, aspects of the operations of 2305 may be performed by a narrowband manager as described with reference to FIGS. 10 through 13.

At 2310, the UE may receive a first resource block shift for aligning a start of a narrowband of the set of narrowbands with a RBG associated with a second protocol. The operations of 2310 may be performed according to the methods described herein. In some examples, aspects of the operations of 2310 may be performed by a RB offset manager as described with reference to FIGS. 10 through 13.

At 2315, the UE may receive a second resource block shift for aligning an end of the narrowband with the RBG associated with the second protocol. The operations of 2315 may be performed according to the methods described herein. In some examples, aspects of the operations of 2315 may be performed by a RB offset manager as described with reference to FIGS. 10 through 13.

At 2325, the UE may align the set of narrowbands based on the system bandwidth and the frequency alignment parameter (e.g., the first resource block shift and/or the second resource block shift), where the downlink transmission is received based on the alignment. The operations of 2325 may be performed according to the methods described herein. In some examples, aspects of the operations of 2325 may be performed by a resource grid alignment manager as described with reference to FIGS. 10 through 13.

At 2330, the UE may receive a downlink transmission based on the identified set of narrowbands and the frequency alignment parameter. The operations of 2330 may be performed according to the methods described herein. In some examples, aspects of the operations of 2330 may be performed by a reception manager as described with reference to FIGS. 10 through 13.

Figure 24:
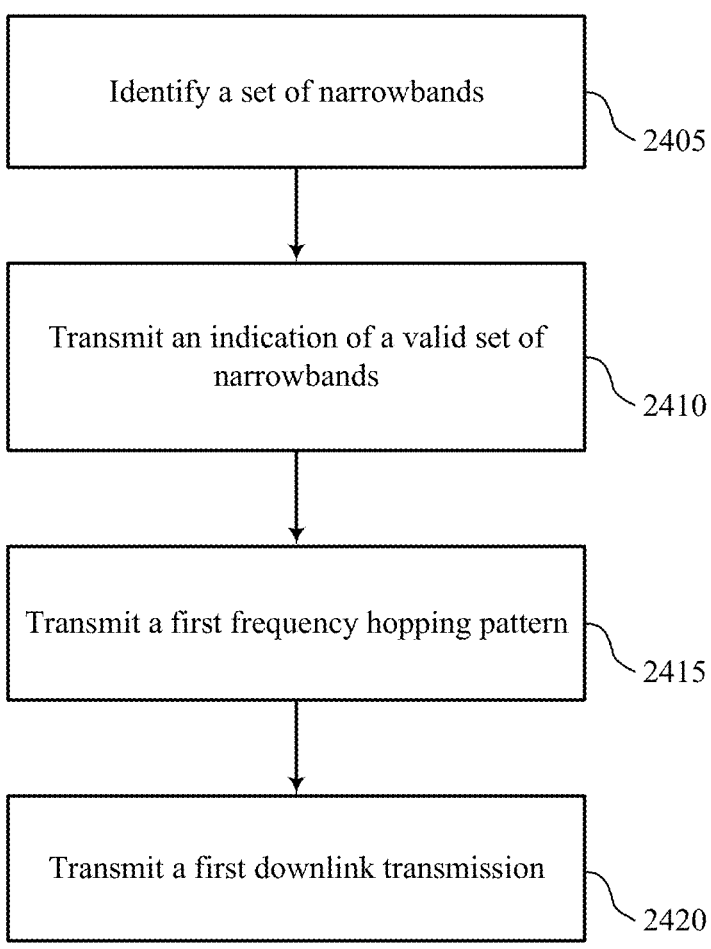

FIG. 24 shows a flowchart illustrating a method 2400 that supports flexible resource allocation for narrowband and wideband coexistence in accordance with aspects of the present disclosure. The operations of method 2400 may be implemented by a base station 105 or its components as described herein. For example, the operations of method 2400 may be performed by a communications manager as described with reference to FIGS. 14 through 17. In some examples, a base station may execute a set of instructions to control the functional elements of the base station to perform the functions described below. Additionally or alternatively, a base station may perform aspects of the functions described below using special-purpose hardware.

At 2405, the base station may identify, based on a system bandwidth of a carrier, a set of narrowbands associated with a first protocol. The operations of 2405 may be performed according to the methods described herein. In some examples, aspects of the operations of 2405 may be performed by a narrowband manager as described with reference to FIGS. 14 through 17.

At 2410, the base station may transmit, to a first UE, an indication of a valid set of narrowbands for the communication using the first protocol. For example, the base station may identify time-frequency resources (e.g., time-frequency resources corresponding to system information signaling, RRC signaling, etc.) over which the indication of the valid set of narrowbands may be transmitted, and may encode and modulate the bits that indicate the indication of a valid set of narrowbands to transmit the encoded and modulated bits over the identified time-frequency resources. The operations of 2410 may be performed according to the methods described herein. In some examples, aspects of the operations of 2410 may be performed by a valid narrowband manager as described with reference to FIGS. 14 through 17.

At 2415, the base station may transmit, to the first UE, a first frequency hopping pattern for the communication using the first protocol. For example, the base station may identify time-frequency resources (e.g., time-frequency resources corresponding to system information signaling, RRC signaling, etc.) over which the indication of the first frequency hopping pattern may be transmitted, and may encode and modulate the bits that indicate the first frequency hopping pattern to transmit the encoded and modulated bits over the identified time-frequency resources. The operations of 2415 may be performed according to the methods described herein. In some examples, aspects of the operations of 2415 may be performed by a frequency hopping manager as described with reference to FIGS. 14 through 17.

At 2420, the base station may transmit, to the first UE, a first downlink transmission based on the valid set of narrowbands and the first frequency hopping pattern. For example, the base station may identify time-frequency resources of a downlink channel (e.g., PDCCH, PDSCH) over which the first downlink transmission may be transmitted, and may encode and modulate the bits that indicate the first downlink transmission to transmit the encoded and modulated bits over the identified time-frequency resources. The operations of 2420 may be performed according to the methods described herein. In some examples, aspects of the operations of 2420 may be performed by a transmission manager as described with reference to FIGS. 14 through 17.

Figure 25:
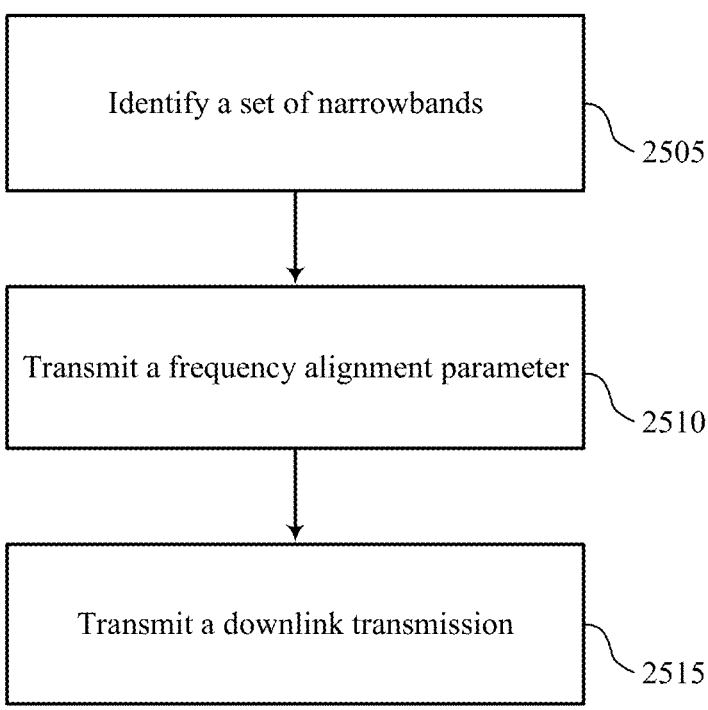

FIG. 25 shows a flowchart illustrating a method 2500 that supports flexible resource allocation for narrowband and wideband coexistence in accordance with aspects of the present disclosure. The operations of method 2500 may be implemented by a base station 105 or its components as described herein. For example, the operations of method 2500 may be performed by a communications manager as described with reference to FIGS. 14 through 17. In some examples, a base station may execute a set of instructions to control the functional elements of the base station to perform the functions described below. Additionally or alternatively, a base station may perform aspects of the functions described below using special-purpose hardware.

At 2505, the base station may identify, based on a system bandwidth of a carrier, a set of narrowbands associated with communication using a first protocol. The operations of 2505 may be performed according to the methods described herein. In some examples, aspects of the operations of 2505 may be performed by a narrowband manager as described with reference to FIGS. 14 through 17.

At 2510, the base station may transmit a frequency alignment parameter for the communication using the first protocol. For example, the base station may identify time-frequency resources (e.g., time-frequency resources corresponding to system information signaling, RRC signaling, etc.) over which the frequency alignment parameter may be transmitted, and may encode and modulate the bits that indicate the frequency alignment parameter to transmit the encoded and modulated bits over the identified time-frequency resources. The operations of 2510 may be performed according to the methods described herein. In some examples, aspects of the operations of 2510 may be performed by a resource grid alignment manager as described with reference to FIGS. 14 through 17.

At 2515, the base station may transmit a downlink transmission based on the identified set of narrowbands and the frequency alignment parameter. For example, the base station may identify time-frequency resources over a downlink channel (e.g., PDCCH, PDSCH) which the downlink transmission may be transmitted, and may encode and modulate the bits that indicate the downlink transmission to transmit the encoded and modulated bits over the identified time-frequency resources. The operations of 2515 may be performed according to the methods described herein. In some examples, aspects of the operations of 2515 may be performed by a transmission manager as described with reference to FIGS. 14 through 17.

Figure 26:
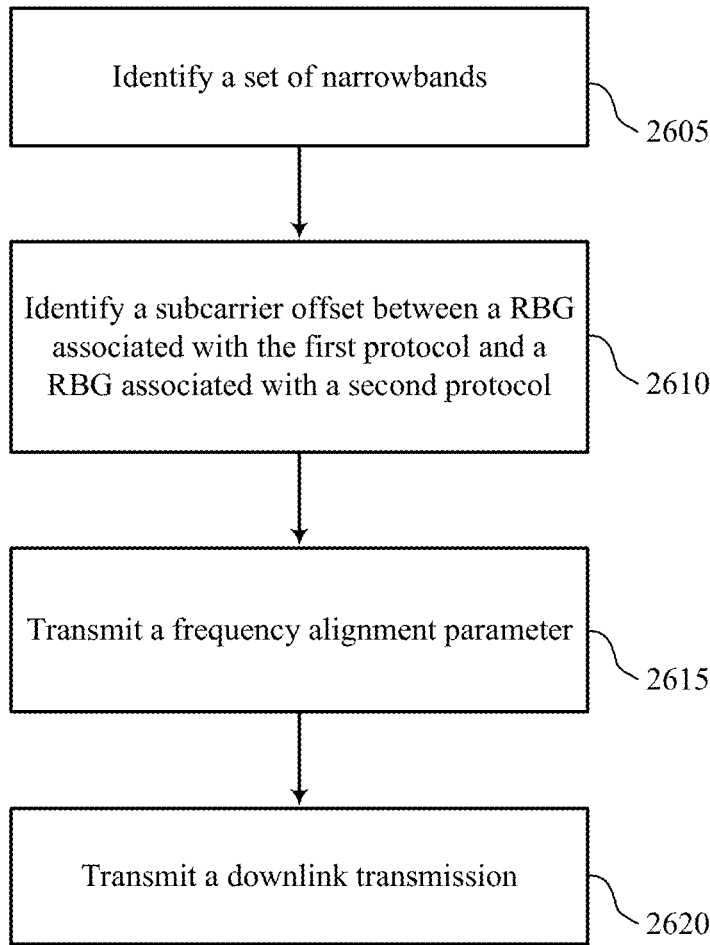

FIG. 26 shows a flowchart illustrating a method 2600 that supports flexible resource allocation for narrowband and wideband coexistence in accordance with aspects of the present disclosure. The operations of method 2600 may be implemented by a base station 105 or its components as described herein. For example, the operations of method 2600 may be performed by a communications manager as described with reference to FIGS. 14 through 17. In some examples, a base station may execute a set of instructions to control the functional elements of the base station to perform the functions described below. Additionally or alternatively, a base station may perform aspects of the functions described below using special-purpose hardware.

At 2605, the base station may identify, based on a system bandwidth of a carrier, a set of narrowbands associated with communication using a first protocol. The operations of 2605 may be performed according to the methods described herein. In some examples, aspects of the operations of 2605 may be performed by a narrowband manager as described with reference to FIGS. 14 through 17.

At 2610, the base station may identify a subcarrier offset between a resource block grid associated with the first protocol and a resource block grid associated with a second protocol, where the frequency alignment parameter is based on the identified subcarrier offset. The operations of 2610 may be performed according to the methods described herein. In some examples, aspects of the operations of 2610 may be performed by a subcarrier offset manager as described with reference to FIGS. 14 through 17.

At 2615, the base station may transmit a frequency alignment parameter for the communication using the first protocol. The operations of 2615 may be performed according to the methods described herein. In some examples, aspects of the operations of 2615 may be performed by a resource grid alignment manager as described with reference to FIGS. 14 through 17.

At 2620, the base station may transmit a downlink transmission based on the identified set of narrowbands and the frequency alignment parameter. The operations of 2620 may be performed according to the methods described herein. In some examples, aspects of the operations of 2620 may be performed by a transmission manager as described with reference to FIGS. 14 through 17.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a user equipment (UE), comprising:
    one or more memories, and one or more processors coupled with the one or more memories, wherein the one or more processors are configured to:
        identify, based at least in part on a system bandwidth of a carrier, a plurality of narrowbands associated with a first protocol;
        receive a frequency alignment parameter for communication using the first protocol, the frequency alignment parameter including a first shift relative to a starting physical resource block (PRB) of a narrowband of the plurality of narrowbands and a second shift relative to an end PRB of the narrowband;
        receive signaling indicating whether to align the starting PRB of the narrowband using the first shift or align the end PRB of the narrowband using the second shift;
        align either the starting PRB or the end PRB of each of the plurality of narrowbands in accordance with the first shift or the second shift based at least in part on the system bandwidth, the frequency alignment parameter, and the signaling; and
        receive a downlink transmission based at least in part on the aligned plurality of narrowbands.

2. The apparatus of claim 1, wherein the one or more processors are configured to cause the apparatus to:
    align the plurality of narrowbands based at least in part on the system bandwidth and the frequency alignment parameter, wherein the downlink transmission is received based at least in part on the alignment.

3. The apparatus of claim 1, wherein the one or more processors configured to receive the frequency alignment parameter are further configured to cause the apparatus to:
    receive a first subcarrier offset for a first set of narrowbands; and
    receive a second subcarrier offset for a second set of narrowbands, wherein the first set of narrowbands are associated with subcarriers having lower frequencies than a center subcarrier of the system bandwidth and the second set of narrowbands are associated with subcarriers having higher frequencies than the center subcarrier.

4. The apparatus of claim 1, wherein the one or more processors configured to receive the frequency alignment parameter are further configured to cause the apparatus to:
    receive a first resource block shift for aligning the starting PRB of the narrowband of the plurality of narrowbands with a resource block group (RBG) associated with a second protocol; and
    receive a second resource block shift for aligning the end PRB of the narrowband with the RBG associated with the second protocol.

5. The apparatus of claim 4, wherein the one or more processors are configured to cause the apparatus to:
    receive a downlink control information (DCI) state indication, wherein the DCI state indication indicates a resource allocation, the resource allocation based on the first resource block shift or the second resource block shift.

6. The apparatus of claim 4, wherein the one or more processors are configured to cause the apparatus to:
    receive a one bit shift indicator associated with one or more narrowbands of the plurality of narrowbands, wherein the one bit shift indicator indicates either the first resource block shift or the second resource block shift.

7. The apparatus of claim 4, wherein the first protocol comprises an enhanced machine type communication (eMTC) protocol and the second protocol comprises a New Radio (NR) protocol, and wherein the frequency alignment parameter is based at least in part on the RBG being associated with the second protocol.

8. A method for wireless communication at a user equipment (UE), comprising:
    identifying, based at least in part on a system bandwidth of a carrier, a plurality of narrowbands associated with a first protocol;
    receiving a frequency alignment parameter for communication using the first protocol, the frequency alignment parameter including a first shift relative to a starting physical resource block (PRB) of a narrowband of the plurality of narrowbands and a second shift relative to an end PRB of the narrowband;
    receiving signaling indicating one of whether to align the starting PRB of the narrowband using the first shift or align the end PRB of the narrowband using the second shift;
    aligning either the starting PRB or the end PRB of each of the plurality of narrowbands in accordance with the first shift or the second shift based at least in part on the system bandwidth, the frequency alignment parameter, and the signaling; and
    receiving a downlink transmission based at least in part on the aligned plurality of narrowbands.

9. The method of claim 8, further comprising:
    aligning the plurality of narrowbands based at least in part on the system bandwidth and the frequency alignment parameter, wherein the downlink transmission is received based at least in part on the alignment.

10. The method of claim 8, wherein receiving the frequency alignment parameter comprises:
    receiving a first subcarrier offset for a first set of narrowbands; and
    receiving a second subcarrier offset for a second set of narrowbands, wherein the first set of narrowbands are associated with subcarriers having lower frequencies than a center subcarrier of the system bandwidth and the second set of narrowbands are associated with subcarriers having higher frequencies than the center subcarrier.

11. The method of claim 8, wherein receiving the frequency alignment parameter comprises:
    receiving a first resource block shift for aligning the starting PRB of the narrowband of the plurality of narrowbands with a resource block group (RBG) associated with a second protocol; and
    receiving a second resource block shift for aligning the end PRB of the narrowband with the RBG associated with the second protocol.

12. The method of claim 11, further comprising:

receiving a downlink control information (DCI) state indication, wherein the DCI state indication indicates a resource allocation, the resource allocation based on the first resource block shift or the second resource block shift.

13. The method of claim 11, further comprising:

receiving a one bit shift indicator associated with one or more narrowbands of the plurality of narrowbands, wherein the one bit shift indicator indicates either the first resource block shift or the second resource block shift.

14. The method of claim 11, wherein the first protocol comprises an enhanced machine type communication (eMTC) protocol and the second protocol comprises a New Radio (NR) protocol, and wherein the frequency alignment parameter is based at least in part on the RBG being associated with the second protocol.

15. An apparatus for wireless communication at a user equipment (UE), comprising:

means for identifying, based at least in part on a system bandwidth of a carrier, a plurality of narrowbands associated with a first protocol;

means for receiving a frequency alignment parameter for communication using the first protocol, the frequency alignment parameter including a first shift relative to a starting PRB of a narrowband of the plurality of narrowbands and a second shift relative to an end PRB of the narrowband;

means for receiving signaling indicating whether to align the starting PRB of the narrowband using the first shift or align the end PRB of the narrowband using the second shift;

means for aligning either the starting PRB or the end PRB of each of the plurality of narrowbands in accordance with the first shift or the second shift based at least in part on the system bandwidth, the frequency alignment parameter, and the signaling; and means for receiving a downlink transmission based at least in part on the aligned plurality of narrowbands.

16. The apparatus of claim 15, wherein the means for receiving the frequency alignment parameter comprises:

means for receiving a first subcarrier offset for a first set of narrowbands; and means for receiving a second subcarrier offset for a second set of narrowbands, wherein the first set of narrowbands are associated with subcarriers having lower frequencies than a center subcarrier of the system bandwidth and the second set of narrowbands are associated with subcarriers having higher frequencies than the center subcarrier.

17. The apparatus of claim 15, wherein the means for receiving the frequency alignment parameter comprises:

means for receiving a first resource block shift for aligning the starting PRB of the narrowband of the plurality of narrowbands with a resource block group (RBG) associated with a second protocol; and means for receiving a second resource block shift for aligning the end PRB of the narrowband with the RBG associated with the second protocol.

18. The apparatus of claim 17, further comprising:

means for receiving a downlink control information (DCI) state indication, wherein the DCI state indication indicates a resource allocation, the resource allocation based on the first resource block shift or the second resource block shift.

19. The apparatus of claim 17, further comprising:

means for receiving a one bit shift indicator associated with one or more narrowbands of the plurality of narrowbands, wherein the one bit shift indicator indicates either the first resource block shift or the second resource block shift.

20. The apparatus of claim 17, wherein the first protocol comprises an enhanced machine type communication (eMTC) protocol and the second protocol comprises a New Radio (NR) protocol, and wherein the frequency alignment parameter is based at least in part on the RBG being associated with the second protocol.

* * * * *